United States Patent
Ozcan et al.

(10) Patent No.: US 12,443,838 B2
(45) Date of Patent: Oct. 14, 2025

(54) DIFFRACTIVE DEEP NEURAL NETWORKS WITH DIFFERENTIAL AND CLASS-SPECIFIC DETECTION

(71) Applicant: THE REGENTS OF THE UNIVERSITY OF CALIFORNIA, Oakland, CA (US)

(72) Inventors: Aydogan Ozcan, Sherman Oaks, CA (US); Yair Rivenson, Los Angeles, CA (US); Jingxi Li, Los Angeles, CA (US); Deniz Mengu, Los Angeles, CA (US); Yi Luo, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 982 days.

(21) Appl. No.: 17/616,983

(22) PCT Filed: Jun. 5, 2020

(86) PCT No.: PCT/US2020/036436
§ 371 (c)(1),
(2) Date: Dec. 6, 2021

(87) PCT Pub. No.: WO2020/247828
PCT Pub. Date: Dec. 10, 2020

(65) Prior Publication Data
US 2022/0327371 A1    Oct. 13, 2022

Related U.S. Application Data

(60) Provisional application No. 62/858,799, filed on Jun. 7, 2019.

(51) Int. Cl.
*G06N 3/067*    (2006.01)
*G02B 27/42*    (2006.01)
(Continued)

(52) U.S. Cl.
CPC ....... *G06N 3/0675* (2013.01); *G02B 27/4277* (2013.01); *G06N 3/08* (2013.01); *G06N 20/00* (2019.01)

(58) Field of Classification Search
CPC ........ G02F 3/00; G06N 3/0675; G06N 20/00; G06N 3/08; G06N 3/02; G06N 3/04;
(Continued)

(56) References Cited

U.S. PATENT DOCUMENTS 5,394,257 A * 2/1995 Horan .................... G06E 3/005
                                                          359/107
5,704,015 A * 12/1997 Ono ..................... G06N 3/0675
                                                          359/107
(Continued)

FOREIGN PATENT DOCUMENTS

WO    WO 2019/200289 A1    10/2019

OTHER PUBLICATIONS

PCT International Preliminary Report on Patentability (Chapter I of the Patent Cooperation Treaty) for PCT/US2020/036436, Applicant: The Regents of the University of California, Form PCT/IB/326 and 373, dated Dec. 16, 2021 (14 pages).
(Continued)

*Primary Examiner* — Arnel C Lavarias
(74) *Attorney, Agent, or Firm* — VISTA IP LAW GROUP LLP

(57) ABSTRACT

A diffractive optical neural network device includes a plurality of diffractive substrate layers arranged in an optical path. The substrate layers are formed with physical features across surfaces thereof that collectively define a trained mapping function between an optical input and an optical output. A plurality of groups of optical sensors are configured to sense and detect the optical output, wherein each group of optical sensors has at least one optical sensor
(Continued)

configured to capture a positive signal from the optical output and at least one optical sensor configured to capture a negative signal from the optical output. Circuitry and/or computer software receives signals or data from the optical sensors and identifies a group of optical sensors in which a normalized differential signal calculated from the positive and negative optical sensors within each group is the largest or the smallest of among all the groups.

23 Claims, 17 Drawing Sheets

(51) Int. Cl.
*G06N 3/08* (2023.01)
*G06N 20/00* (2019.01)

(58) Field of Classification Search
CPC .......... G06N 3/042; G06N 3/06; G06N 3/067; G02B 27/4277; G02B 5/18; G02B 2005/1804; G02B 5/1828; G02B 5/1861; G02B 5/1866; G02B 5/1871; G02B 5/1876; G02B 5/188; G02B 27/00; G02B 27/0012; G02B 27/42; G02B 27/4233; G02B 27/4272; G02B 27/44
USPC ....... 359/572, 107, 558, 566, 569, 573, 576; 706/12, 15, 16, 20, 25, 26, 27
See application file for complete search history.

(56) References Cited

U.S. PATENT DOCUMENTS

| | | | |
|---|---|---|---|
| 2017/0351293 A1 | 12/2017 | Carolan et al. | |
| 2021/0142170 A1* | 5/2021 | Ozcan | G02B 27/4205 |
| 2023/0162016 A1* | 5/2023 | Ozcan | G06N 3/084 |
| | | | 706/15 |

OTHER PUBLICATIONS

Hengameh Bagherian et al., On-Chip Optical Convolutional Neural Networks, arXiv:1808.03303v2 [cs.ET] Aug. 16, 2018.
J. Bueno et al., Reinforcement learning in a large-scale photonic recurrent neural network, Optica, vol. 5, No. 6, Jun. 2018, 757-760.
Julie Chang et al., Hybrid optical-electronic convolutional neural networks with optimized diffractive optics for image classification, Scientific Reports (2018) 8:12324, DOI:10.1038/s41598-018-30619-y.
Tyler W. Hughes et al., Training of photonic neural networks through in situ backpropagation, arXiv:1805.09943v1 [physics. optics] May 25, 2018.
Cheng Jua et al., The Relative Performance of Ensemble Methods with Deep Convolutional Neural Networks for Image Classification, J. Appl Stat. 2018; 45(15): 2800-2818. doi:10.1080/02664763.2018. 1441383.
Mohammadreza Khorasaninejad et al., Metalenses at visible wavelengths: Diffraction-limited focusing and subwavelength resolution imaging, Science 352 (6290), 1190-1194, (2016).
Xing Lin et al., All-optical machine learning using diffractive deep neural networks, Science 361, 1004-1008 (2018).
Deniz Mengu et al., Analysis of Diffractive Optical Neural Networks and Their Integration with Electronic Neural Networks, (2018).
Bhavin J. Shastri et al., Principles of Neuromorphic Photonics, arXiv:1801.00016v1 [cs.ET] Dec. 29, 2017.
Nicholas Soures et al., Neuro-MMI: A hybrid photonic-electronic machine learning platform, (2020).
Chiheb Trabelsi et al., Deep Complex Networks, arXiv:1705. 09792v4 [cs.NE] Feb. 25, 2018.
Yuzhe Xiao, Nonlinear Metasurface Based on Giant Optical Kerr Response of Gold Quantum Wells, ACS Photonics xxx, xxx, xxx-xxx, DOI:10.1021/acsphotonics.7b01140 (2018).
PCT International Search Report for PCT/US2020/036436, Applicant: The Regents of the University of California, Form PCT/ISA/210 and 220, dated Aug. 31, 2020 (3 pages).
PCT Written Opinion of the International Search Authority for PCT/US2020/036436, Applicant: The Regents of the University of California, Form PCT/ISA/237, dated Aug. 31, 2020 (12 pages).
Yair Rivenson et al., Class-specific differential detection in diffractive optical neural networks improves inference accuracy, Advanced Photonics, Jul./Aug. 2019, vol. 1(4), downloaded from https:/www. spiedigitalilibrary.org/journals/Advanced-Photonics on Aug. 7, 2020.
Deniz Mengu et al., Analysis of Diffractive Optical Neural Networks and Their Integration with Electronic Neural Network, submitted Oct. 3, 2018, retrieved from the internet: URL:https://arxiv. org/abs/1810.01916v1, retrieved Aug. 13, 2020, pp. 1-36.
Jingxi Li et al., Machine Vision using Diffractive Spectral Encoding, University of California, published: May 15, 2020, retrieved from the internet https://arxiv.org/ftp/arxiv/papers/2005/2005, 11387. pdf, retrieved Aug. 13, 2020, pp. 1-16.

* cited by examiner

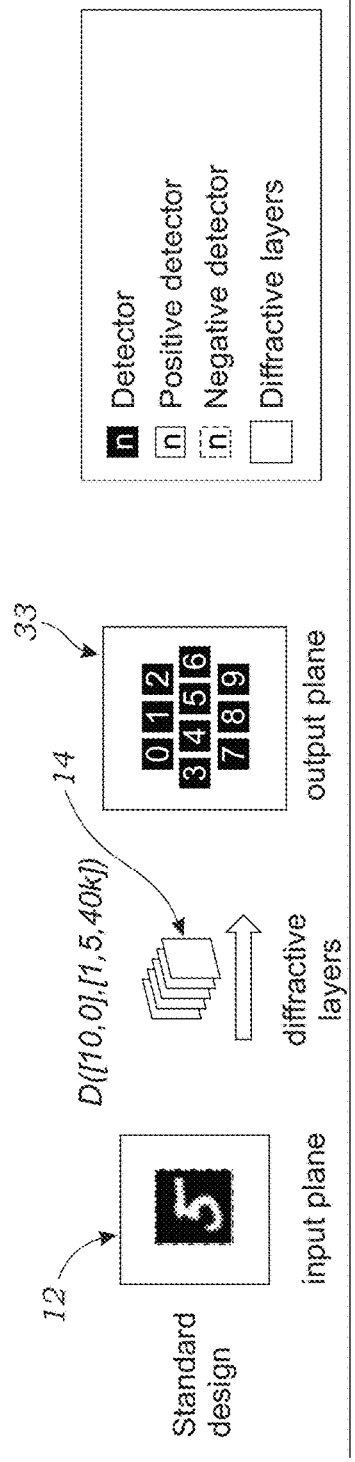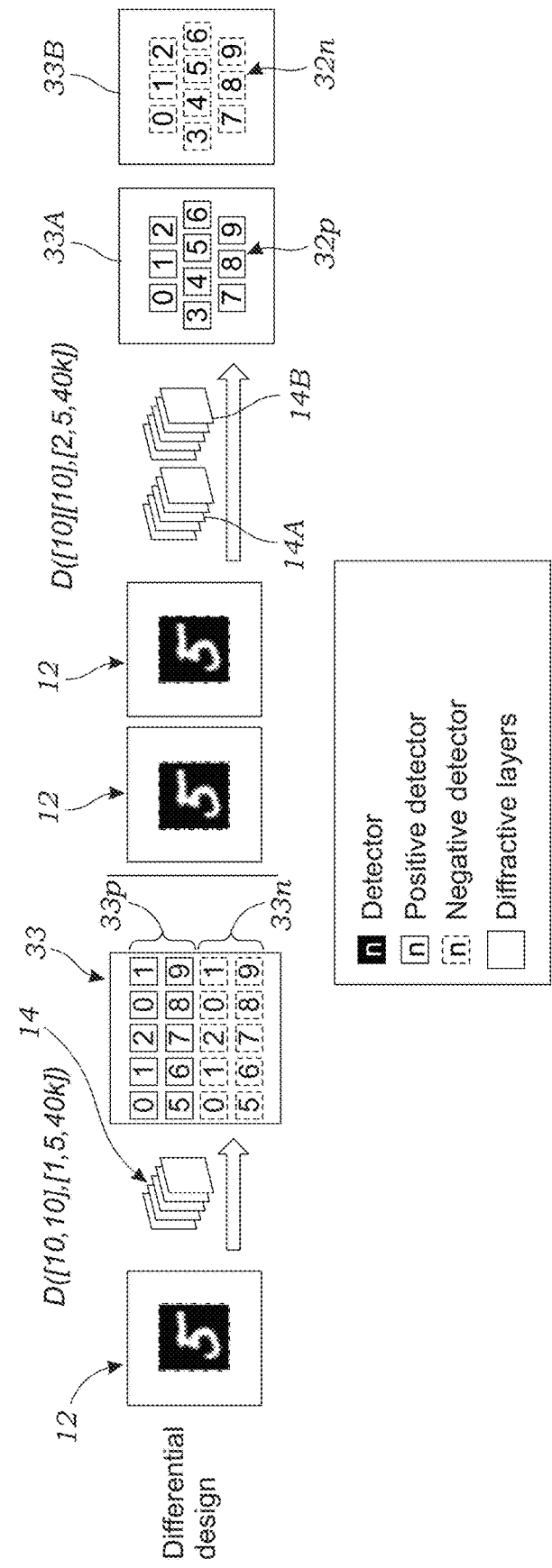
FIG. 2A
FIG. 2B

DIFFRACTIVE DEEP NEURAL NETWORKS WITH DIFFERENTIAL AND CLASS-SPECIFIC DETECTION

RELATED APPLICATION

This Application is a U.S. National Stage filing under 35 U.S.C. § 371 of International Application No. PCT/US2020/036436, filed on Jun. 5, 2020, which claims priority to U.S. Provisional Patent Application No. 62/858,799 filed on Jun. 7, 2019, which are hereby incorporated by reference. Priority is claimed pursuant to 35 U.S.C. §§ 119, 371 and any other applicable statute.

TECHNICAL FIELD

The technical field generally relates to an optical deep learning physical architecture or platform that can perform, at the speed of light, various complex functions and tasks that current computer-based neural networks can implement. The optical deep learning physical architecture or platform has applications in image analysis, feature detection, object classification, camera designs, and other optical components that can learn to perform unique functions or tasks.

BACKGROUND

Machine learning, and in particular deep learning, has drastically impacted the area of information and data processing in recent years. Research on optical machine learning has a very rich history, due to its advantages in terms of power efficiency, scalability, computational capacity and speed. With today's substantial computational power, advances in manufacturing technologies (e.g., 3D printing, lithography) and increasing availability of machine learning-related programming tools (e.g., TENSORFLOW® software), there has been remarkable progress on the use of machine learning in optics and photonics, focusing on e.g., the development of new integrated photonics devices or the design of application specific free-space optical neural networks.

The task of object recognition and classification is an important application area of machine learning. It is conventionally realized in two main steps. First, a lens-based imaging system followed by a CMOS/CCD array captures a scene at hand. The digitized and stored image of the scene is then fed into an all-electronic artificial neural network (ANN) pre-trained for the task. The sampling density and, thus the number of detectors on the opto-electronic sensor plane, are dictated by the desired spatial and/or temporal resolution of the designed system. In a classification system, high spatial resolution is generally desired due to the vital importance of spatial features for the performance of ANNs, forcing the pixel count and density of the sensor arrays to be relatively high, which, consequently, increases the requirements on the size of the memory as well as the computational power, inevitably hampering the effective frame-rate. Compressive sensing/sampling field has broadly aimed to overcome some of these resource inefficiencies in conventional optical systems. However, computationally demanding recovery algorithms associated with compressive sensing framework partially hinders its application for a wide range of areas in need of real-time operation.

In earlier work, such as that disclosed in International Patent Publication No. WO 2019/200289, diffractive deep neural networks were introduced, which are composed of successive diffractive optical layers (transmissive and/or reflective), trained and designed using deep learning methods in a computer, after which it is physically fabricated to all-optically perform statistical inference based on its trained task at hand. In this framework, complex wave field of a given scene or object, illuminated by a coherent light source, propagates through the diffractive layers which collectively modulate the propagating light such that the intensity at the output plane of the diffractive network is distributed in a desired way, i.e., based on the specific classification or imaging task of interest, these diffractive layers jointing determine the output plane intensity in response to an input. The applications of this concept for the design of optical imaging systems as well as all-optical object classification were experimentally realized.

Unlike traditional, imaging-based machine vision systems, a diffractive optical neural network trained for a classification task needs only a few opto-electronic detectors, as many as the number of individual classes in a given dataset. Following their design and fabrication, diffractive optical neural networks execute classification with passive optical components, without the need for any power except the illumination beam and a simple max operation circuitry at the back-end. Unless optical nonlinearities are utilized, diffractive optical neural networks are linear in nature, except the final opto-electronic detector plane; despite its linearity, additional diffractive layers have been shown to improve the generalization and inference performance of the network, indicating the depth advantage that comes with the increasing number of diffractive neural layers in the optical network. With a single photo-detector assigned to each individual class of objects, Mengu et al. demonstrated a blind testing accuracy of 97.18% for all-optical classification of handwritten digits (MNIST database, where each digit was encoded in the amplitude channel of the input), and achieved 89.13% for all-optical classification of fashion-products (Fashion-MNIST database, where each object was encoded in the phase channel of the input). See D. Mengu et al., "Analysis of Diffractive Optical Neural Networks and Their Integration with Electronic Neural Networks," $ArXiv$181001916 $Phys.$, October 2018.

In spite of the promising performance of earlier work on diffractive optical networks, these architectures suffer from a well-known limitation in optics: the opto-electronic sensors/detectors are only sensitive to the incident optical power rather than the complex optical field, which limits the range of realizable values to non-negative real numbers.

SUMMARY

As disclosed herein, the diffractive deep neural network uses configurations that solves the prior limitation of optical sensors/detectors being limited to detection optical power corresponding to non-negative real numbers. This non-negativity of the detected signal at the output plane of diffractive neural networks is mitigated through a differential detection scheme, which employs a pair (or other groupings) of two (2) opto-electronic sensors/detectors per data class at the output plane (see e.g., FIG. 2B). In this differential detection scheme, the output signal for each class is represented by the normalized difference of the signals captured or measured by the corresponding detector pair. Therefore, half of the opto-electronic sensors/detectors are accounted for the positive part of the output signal, while the other half of the opto-electronic sensors/detectors represents the negative part. The final inference of the diffractive optical network is made based on the maximum differential signal detected by these positive and negative detector pairs, each representing a separate class. Using this differential measurement scheme together with five (5) diffractive layers having a total of 0.2 Million neurons, blind testing accuracies of 98.54%, 90.54% and 48.51% were numerically achieved, for MNIST, Fashion-MNIST and grayscale CIFAR-10 datasets, respectively. For comparison, without using the differential detection scheme, similar diffractive optical neural networks achieve blind testing accuracies of 97.51%, 89.85% and 45.20% for the same datasets, respectively.

In addition to the introduction of differential detection per class, another configuration made use of parallel computation capability of passive diffractive layers, and jointly-optimized separate diffractive optical neural networks for positive and negative sensors/detectors, which are designed to work in parallel for differential inference of data classes. In some other implementations, a group of diffractive optical networks were jointly-optimized, where each diffractive network was specialized to infer a subset of classes (see, e.g., FIGS. 5A-5D). The results demonstrate the significant advantages of these design strategies that use a combination of differential detection and class-specific optimization of individual diffractive neural networks that work all in parallel. For example, with class-specific differential diffractive optical neural networks that are jointly-optimized, experimental results demonstrate that one can numerically achieve blind testing accuracies of 98.52%, 91.48% and 50.82% for MNIST, Fashion-MNIST and grayscale CIFAR-10 datasets, respectively, coming close to the inference performance of e.g., LeNet, an all-electronic deep neural network. Apart from these jointly-optimized diffractive neural networks, independently-optimized multiple diffractive neural networks were also designed, inspired by ensemble methods used in deep learning. For example, using three (3) independently-optimized differential diffractive neural networks that separately project their diffracted light onto a common output/detector plane, blind testing accuracies of 98.59%, 91.06% and 51.44% were numerically achieved for MNIST, Fashion-MNIST and grayscale CIFAR-10 datasets, respectively.

Because of the passive nature of diffractive neural networks, at the cost of optical set-up alignment complexity as well as illumination power increase, one can create scalable, low-power and competitive solutions to perform optical computation and machine learning through these jointly-optimized diffractive neural network systems.

In one embodiment, a diffractive optical neural network device for machine learning, classification, and/or processing of at least one optical image, signal, or data includes a plurality of optically transmissive and/or reflective substrate layers arranged in one or more optical paths, each of the plurality of optically transmissive and/or reflective substrate layers comprising a plurality of physical features formed on or within the optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between an input optical image, input optical signal, or input data to the plurality of optically transmissive and/or reflective substrate layers and one or more output optical images, output optical signals, or data created by optical diffraction/reflection through/off the plurality of optically transmissive and/or reflective substrate layers. The device further includes a plurality of groups of optical sensors configured to sense and detect the output optical images, output optical signals, or data resulting from the plurality of optically transmissive and/or reflective substrate layers, wherein each group of optical sensors comprises at least one optical sensor configured to capture a positive signal from the output optical images, output optical signals, or data and at least one optical sensor configured to capture a negative signal from the output optical images, output optical signals, or data. The device further includes circuitry and/or computer software configured to identify a group of optical sensors within the plurality in which a normalized signal difference calculated from the positive and negative optical sensors within each group is the largest or the smallest of among all the groups.

In another embodiment, a diffractive optical neural network device for machine learning, classification, and/or processing of at least one optical image, signal, or data includes a plurality of diffractive optical neural network devices configured to receive an input optical image, input optical signal, or data, each of the plurality of diffractive optical neural network devices having a plurality of optically transmissive and/or reflective substrate layers arranged in one or more optical paths, each of the optically transmissive and/or reflective substrate layers comprising a plurality of physical features formed on or within the plurality of optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between the input optical image, input optical signal, or data to the plurality of optically transmissive and/or reflective substrate layers and one or more output optical images, output optical signals, or data created by optical diffraction/reflection through/off the plurality of optically transmissive and/or reflective substrate layers. The device includes one or more optical sensors configured to sense and detect the output optical images, output optical signals, or data resulting from the plurality of optically transmissive and/or reflective substrate layers for each of the plurality of diffractive optical neural network devices.

In another embodiment, a method of machine learning, classifying, and/or processing at least one optical image, signal, or data using one or more of diffractive optical neural network devices includes passing light through one or more diffractive optical neural network devices, each optical neural network device comprising a plurality of optically transmissive and/or reflective substrate layers arranged in one or more optical paths, each of the a plurality of optically transmissive and/or reflective substrate layers comprising a plurality of physical features formed on or within a plurality of optically transmissive and/or reflective substrate layers and having different complex-valued transmission and/or reflection coefficients as a function of lateral coordinates across each substrate layer, wherein a plurality of optically transmissive and/or reflective substrate layers and the plurality of physical features thereon collectively define a trained mapping function between an input optical image, optical signal, or data to a plurality of optically transmissive and/or reflective substrate layers and one or more output images, optical signals, or data created by optical diffraction/reflection through/off a plurality of optically transmissive and/or reflective substrate layers. Light is captured with one or more optical sensors at each of the diffractive optical neural network devices, wherein the machine learning task and/or the classification, and/or the processing is based the intensity of the one or more output optical images, optical signals, or data at the one or more optical sensors.

In another embodiment, a diffractive optical neural network device for machine learning, classifying, and/or processing at least one optical image, signal, or data includes a plurality of optically transmissive and/or reflective substrate layers arranged in one or more optical paths, each of plurality of optically transmissive and/or reflective substrate layers comprising a plurality of physical features formed on or within plurality of optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between an input optical image, optical signal, or data to plurality of optically transmissive and/or reflective substrate layers and one or more output optical images, optical signals, or data created by optical diffraction/reflection through/off the plurality of optically transmissive and/or reflective substrate layers. The device further includes a plurality of groups of optical sensors configured to sense and detect the output optical images, optical signals, or data resulting from plurality of optically transmissive and/or reflective substrate layers, wherein each group of optical sensors comprises at least one optical sensor configured to capture a positive signal from the one or more output optical images, optical signals, or data and at least one optical sensor configured to capture a negative signal from the one or more output optical images, optical signals, or data, wherein the optical sensors of each group are each associated with individual scaling factors. The device includes circuitry and/or computer software configured to identify a group of optical sensors within the plurality in which a signal difference between the optical sensor groups calculated using the corresponding scaling factors is the largest or the smallest of the plurality.

In another embodiment, a diffractive optical neural network device for machine learning, classifying, and/or processing at least one optical image, signal, or data includes a plurality of diffractive optical neural network devices configured to receive light from an input optical image, signal, or data. Each of the plurality of diffractive optical neural network devices includes a plurality of optically transmissive and/or reflective substrate layers arranged in one or more optical paths, each of the plurality of optically transmissive and/or reflective substrate layers comprising a plurality of physical features formed on or within the plurality of optically transmissive and/or reflective substrate layers and having different complex-valued transmission/reflection coefficients as a function of lateral coordinates across each substrate layer, wherein the plurality of optically transmissive and/or reflective substrate layers and the plurality of physical features thereon collectively define a trained mapping function between an input optical image, optical signal, or data to the plurality of optically transmissive and/or reflective substrate layers and one or more output optical images, optical signals, or data created by optical diffraction/reflection through/off the plurality of optically transmissive and/or reflective substrate layers. The diffractive optical neural network devices further include a plurality of groups of optical sensors configured to sense and detect the output optical images, optical signals, or data resulting from the plurality of optically transmissive and/or reflective substrate layers, wherein each group of optical sensors comprises at least one optical sensor configured to capture a positive signal from the one or more output optical images, optical signals, or data and at least one optical sensor configured to capture a negative signal from the one or more output optical images, optical signals, or data, wherein the optical sensors of each group are each associated with individual scaling factors. The diffractive optical neural network devices further include circuitry and/or computer software configured to identify a group of optical sensors within the plurality in which a signal difference between the optical sensor groups calculated using the corresponding scaling factors is the largest or the smallest of the plurality, wherein the identified group corresponds to a particular class of the input optical image, signal, or data.

BRIEF DESCRIPTION OF THE DRAWINGS

In FIG. 1A, the light that passes through the diffractive deep neural network is then detected by a plurality of optical sensors/detectors that are arranged in pairs with one of the pairs detecting the positive signal while the other detector detecting the negative signal.

FIG. 1D illustrates another embodiment in which a beam splitter splits the light from the object to two different diffractive deep neural networks each with their own detector array (sensor array #1 and sensor array #2). In this embodiment there are two detector arrays with different output planes; one plane for a first diffractive optical neural network device and a second output plane for a second diffractive optical network.

FIGS. 2A-2D illustrate different diffractive neural network design strategies. FIG. 2A illustrates the standard (prior) design and refers to D([M,0],[1,L,P]), where M is the number of classes in the target dataset, which in this specific design is also equal to the number of sensors/detectors per diffractive neural network, L is the number of diffractive layers per optical network, and P refers to the number of neurons per diffractive layer. In the examples shown in this figure, L=5, P=40 k, meaning 0.2 Million neurons in total.

FIG. 2B illustrates the differential design. Shown on the left is one design and refers to D([M,M],[1,L,P]), whereas the design on the right refers to D([M][M],[2,L,P]) as it uses two different jointly-optimized diffractive networks, separating the positive and the negative sensors/detectors by placing them at different output planes without optical coupling between the two. FIG. 2C illustrates a class-specific design and refers to D([M/N,0],[N,L,P]), where N>1 is the number of class sub-sets (in this example, N=2 case is shown) (also illustrated in FIGS. 5A-5D). FIG. 2D illustrates the class-specific differential design and refers to D([M/N,M/N],[N,L,P]) where N=2 is illustrated. In general, there can be another version of a class-specific differential design where each diffractive neural network has only positive or negative sensors/detectors at the corresponding output plane; this special case is denoted with D([M/N][M/N],[2N,L,P]), where 2N>2 refers to $^{th}$ number of jointly-designed diffractive neural networks. N=1 case, i.e., D([M][M],[2,L,P]) is included as part of FIG. 2B right panel, and it is not considered under the class-specific neural network design since there is no class separation at the output/detector planes.

FIG. 5A illustrates the setup of the class-specific design, D([M/2,0],[2,L,P]). In the example shown in FIG. 5A, M=10, L=5, P=40 k. FIG. 5B illustrates how the diffractive optical neural network of FIG. 5A correctly classified test object from the MNIST dataset is shown. Subparts of FIG. 5B illustrate the following: i. Target object placed at the input plane and illuminated by a uniform plane wave, ii. Normalized intensity distribution observed at the two output planes of the diffractive optical neural networks, iii. Normalized optical signal detected by the sensors/detectors. FIGS. 5C and 5D are same as in FIG. 5B, except for Fashion-MNIST and CIFAR-10 datasets, respectively. Note that while the input object in FIG. 5B is modeled as an amplitude-encoded object, the gray levels shown in FIG. 5C and FIG. 5D represent phase-encoded perfectly transparent input objects.

FIG. 7A uses MNIST, FIG. 7B uses Fashion-MNIST and FIG. 7C uses grayscale CIFAR-10. Not to perturb the inference results of each diffractive network due to constructive/destructive interference, incoherent summation of the optical signals of each diffractive network at the common output plane is considered here, which can be achieved by adjusting the relative optical path length differences between the individual diffractive networks to be larger than the temporal coherence length of the illumination source.

DETAILED DESCRIPTION OF THE
ILLUSTRATED EMBODIMENTS

Figure 1A:
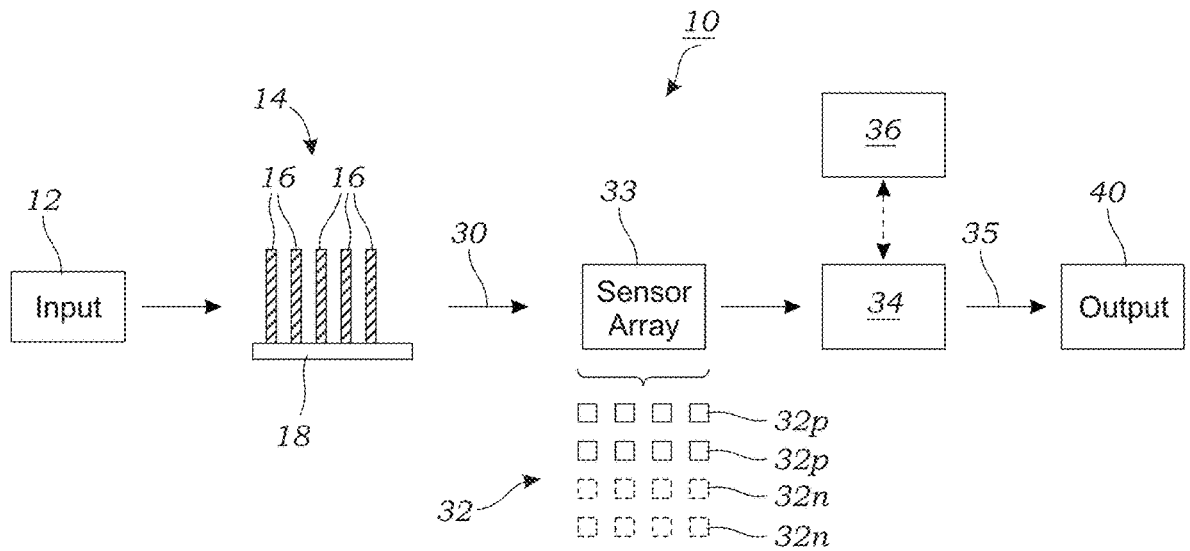
FIG. 1A schematically illustrates one embodiment of a diffractive deep neural network. An optical image, optical signal, or optical data is input into the diffractive deep neural network. This may include a source of light (which may be natural or artificial) directs light onto an object which reflect (or passes through the object in other embodiments) and is directed through the diffractive deep neural network (or in alternative embodiments reflects off the layers of the diffractive deep neural network). In this mode, light passes through the individual substrate layers that form the diffractive deep neural network.
Figure 1B:
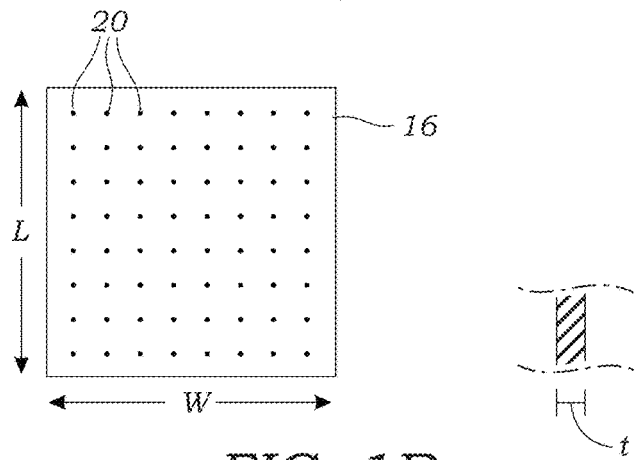
FIG. 1B illustrates a single optically transmissive and/or reflective substrate layer that is used as part of a diffractive optical neural network device.
Figure 1C:
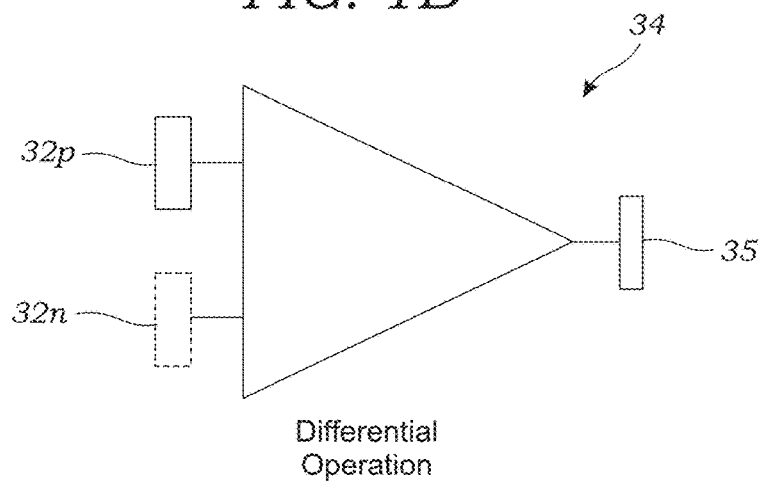
FIG. 1C illustrates a differential amplifier circuit that is used to generate an output that is the signal difference between the inputs from the negative sensor and the positive sensor within a particular group (e.g., pair).
Figure 1D:
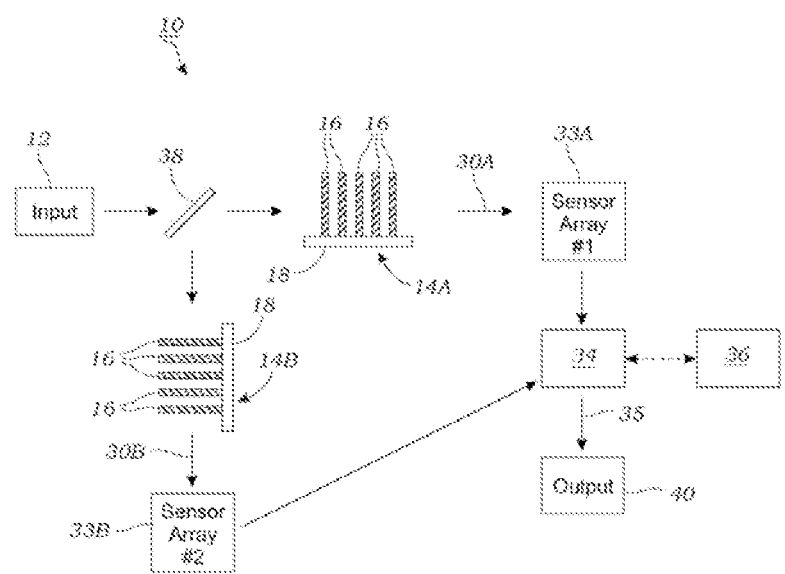
FIG. 1D schematically illustrates another embodiment of a diffractive deep neural network.

FIGS. 1A and 1D schematically illustrate embodiments of diffractive optical neural network devices 10 according to various embodiments. FIG. 1A illustrates an embodiment, of a diffractive optical neural network device 10. The diffractive optical neural network devices 10 described herein may be used for machine learning, classification, and/or processing (separately or combinations thereof) of at least one optical image, optical signal, or optical data (e.g., optically encoded data). As seen in FIG. 1A, an optical input 12 is input to the diffractive optical neural network device 10. The optical input 12 may include an optical image, optical signal, or optical data as described herein. This may include, for example, images of one or more objects that are then classified by the diffractive optical neural network device 10. In some embodiments, the optical input 12 may include an image including one or more objects therein. For example, an optical image 12 may be generated when a source of light directs light onto an object (or multiple objects) which reflects off (or is transmitted through) and is directed through the diffractive optical network device 10. The object(s) may also emit their own optical signal (e.g., emit fluorescence light). The object(s) may be macro-sized (i.e., large such as those visible without magnification) in some embodiments. In other embodiments, for example, for microscopic applications, the object(s) may be very small (e.g., microscopic). Optical images may also be captured by a front-end camera or optical device and projected through the diffractive optical neural network device 10.

The diffractive optical neural network device 10 contains one or more diffractive optical networks 14 that each contain a plurality of optically transmissive and/or reflective substrate layers 16 arranged in one or more optical paths. The substrate layers 16 are formed as a physical substrate or matrix of optically transmissive material (for transmission mode) or optically reflective material (for reflective mode). Combinations of optically transmissive and optically reflective substrate layers 16 may also be used. FIG. 1A illustrates substrate layers 16 in transmission mode where light or optical radiation transmits and diffracts through the substrate layers 16. Exemplary materials that may be used for the substrate layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. In some embodiments, one or more substrate layers 16 of the diffractive network may comprise reconfigurable features such as, for example, spatial light modulators. That is to say the layers 16 of the optical network 14 may include reconfigurable neurons using, for instance, spatial light modulators.

The light or optical radiation that forms the input 12 is directed through the diffractive optical network 14 along an optical path (or in other embodiments along multiple optical paths). The substrate layers 16 are held within a holder 18 that maintain the various substrate layers 16 in a fixed state whereby the various layers are separated from one another. The actual number of substrate layers 16 that collectively defined the diffractive optical network 14 may vary but is typically two (2) or more and less than ten (10), but may vary.

As recited above, in some embodiments, the input image, signal, or data 12 may originate from one or more objects that illuminated from an external source of light (e.g., artificial source of light or natural lighting (e.g., sun light). In still other embodiments, the object(s) may emit fluorescent light or emissive radiation in response to the light from the source of light. For example, the source of light may act as an excitation light source and the diffractive optical network device 10 receives fluorescent light that is emitted from the object(s). The source of light may include a natural light source such as the sun. The source of light may also include an artificial light source such as a laser, light bulb, light emitting diode (LED), laser diode, and the like. The source of light may produce coherent light, incoherent light, or partially coherent light. In some instances, the source of light may be filtered prior to illuminating the object(s). The source of light that illuminates the object may have any number of wavelengths including visible light (e.g., light with a wavelength in the range of about 380 nm to about 740 nm) as well as light outside the perception range of humans. For example, the wavelength operating range may extend beyond the visible perception range of humans (e.g., from about 300 nm to about 1,000 nm).

Each substrate layer 16 of the diffractive optical network 14 has a plurality of physical features 20 (FIG. 1B) formed on the surface of the substrate layer 16 or within the substrate layer 16 itself that collectively define a pattern of physical locations along the length and width of each substrate layer 16 that have varied complex-valued transmission coefficients (or varied complex-valued transmission reflection coefficients). The physical features 20 formed on or in the substrate layers 16 thus create a pattern of physical locations on or within the substrate layers 16 that have different complex-valued transmission coefficients as a function of lateral coordinates (e.g., length and width and in some embodiments depth) across each substrate layer 16. In some embodiments, each separate physical feature 20 may define a discrete physical location on the substrate layer 16 while in other embodiments, multiple physical features 20 may combine or collectively define a physical region with a particular complex-valued transmission coefficient. The plurality of substrate layers 16 arranged along the optical path collectively define a trained mapping function between an input 12 of an optical image, signal, or data to the plurality of substrate layers 16 and an output 30 that may include an optical image, optical signal, or data that is created by optical diffraction through the plurality of substrate layers 16 (or reflection from the substrate layers 16). The pattern of physical locations formed by the physical features 20 may define, in some embodiments, an array located across the surface of the substrate layer 16. Additional details regarding the substrate layers 16 and physical features 20 that are formed thereon may be found in International Patent Application Publication No. WO 2019/200289, which is incorporated herein by reference.

The substrate layer 16 in one embodiment is a two-dimensional generally planer substrate having a length (L), width (W), and thickness (t) that all may vary depending on the particular application. In other embodiments, the substrate layer 16 may be non-planer such as, for example, curved. The physical features 20 and the physical regions formed thereby act as artificial "neurons" that connect to other "neurons" of other substrate layers 16 of the diffractive optical network 14 through optical diffraction (or reflection) and alter the phase and/or amplitude of the light wave. The particular number and density of the physical features 20 and the artificial neurons that are formed thereby in each substrate layer 16 may vary depending on the type of application. In some embodiments, the total number of artificial neurons may only need to be in the hundreds or thousands while in other embodiments, hundreds of thousands or millions of neurons or more may be used. Likewise, the number of layers 16 that are used in a particular diffractive optical network device 10 may vary although it typically ranges from at least two substrate layers 16 to less than ten substrate layers 16.

The output optical image, output optical signal, or data 30 is captured by a plurality of optical sensors 32 that form, in one embodiment, an array 33 of optical sensors (or detectors) 32 although they may be arranged in any number of patterns or arrangement. The optical sensors 32 may include, for example, photodetectors (e.g., photodiode such as avalanche photodiode detector (APD)), photomultiplier (PMT) devices, multiple image sensors, and the like. The optical sensors 32 may also include individual pixels or a collection of pixels found in in CCD or CMOS image sensors. The optical sensors 32 are, in some embodiments, coupled to circuitry 34 that is used to perform a differential operation on groups of optical sensors 32. In particular, in one implementation, a group of optical sensors 32 is formed by a pair of optical sensors 32 with one of the optical sensors 32 being classified as a "positive" optical sensor 32p and the other optical sensor 32 being classified as a "negative" optical sensor 32n. A positive optical sensor 32p is an optical sensor 32 whose output (e.g., output signal or data) is added to another optical signal or data with a positive scaling factor or coefficient. A negative optical sensor 32n is an optical sensor 32 whose output (e.g., output signal or data) is added to another optical signal or data with a negative scaling factor or coefficient.

For example, FIG. 1C illustrates differential amplifier circuit 34 that is used to generate an output 35 that is the signal difference between the inputs from the negative sensor 32n and the positive sensor 32p within a particular group. Each group of optical sensors 32 include its own circuitry or hardware 34 (or share common circuitry or hardware 34 with time multiplexing of inputs) that is used to calculate the signal difference within the negative optical sensor(s) 32n and positive optical sensor(s) 32p making up the group (e.g., pair). As explained herein, in one embodiment the final output or classification 40 (FIGS. 1A and 1D) is based on identifying the particular optical sensor 32 group where the normalized signal difference is maximized. That is to say, the particular group of optical sensors 32 is identified that has the largest normalized signal difference. This group of optical sensors 32 is associated with a particular classification which is then output 40. In some embodiments, the grouping may involve a pair of optical sensors 32 (e.g., one positive optical sensor 32p and one negative optical sensor 32n). Groupings, however, may encompass additional variations such as two or more positive optical sensors 32p and two or more negative optical sensors 32n.

In yet another embodiment, final output or classification 40 (FIGS. 1A and 1D) is based on identifying the particular optical sensor 32 group where the normalized differential signal is minimized. That is to say, the particular group of optical sensors 32 is identified that has the smallest normalized differential signal. This group of optical sensors 32 is associated with a particular classification which is then output 40. In some embodiments, the grouping may involve a pair of optical sensors 32 (e.g., one positive optical sensor 32p and one negative optical sensor 32n). Groupings, however, may encompass additional variations such as two or more positive optical sensors 32p and two or more negative optical sensors 32n.

Moreover, the number of positive optical sensors 32p does not have to equal the number of negative optical sensors 32n in a group (e.g., two positive optical sensors 32p and one negative optical sensor 32n). This differential operation may be performed using dedicated circuitry/hardware 34 and/or through software. For example, an optional computing device 36 may be used to run the software that receives data from the plurality of optical sensors 32. The computing device 36 may include a computer or the like such as a personal computer, laptop, server, mobile computing device. The computing device 36 may also include one or more dedicated processors.

In another embodiment, each optical sensor 32 is associated with a scaling factor (or coefficient) that is used in calculating the signal difference to determine the output of the diffractive optical neural network. The respective signals from each optical sensor 32 may be multiplied by the respective scaling factor or coefficient. These scaling factors may be pre-determined or learned using machine learning and training. In some embodiments, the scaling factors are equal to each other within a single class but are different among different classes. In some embodiments, the scaling factors are all equal to 1 or unity for each class of image, signal, or data (e.g., positive optical sensors 32p have a scaling factor of 1 and negative optical sensors 32n may have a scaling factor of −1). In other embodiments, different scaling factors other than 1 may be used. The use of scaling factors enables certain groups of optical sensors 32 to be weighted more or less depending on the task at hand. For example, certain groups of optical sensors 32 may be better at classifying an optical image, optical signal, or optical data input 12 and may have a larger scaling factor. Similarly, other groups of optical sensors 32 may be noisy or perhaps have less importance or significance and may have a smaller scaling factor.

FIG. 1D illustrates another embodiment of a diffractive optical neural network device 10. In this embodiment, the diffractive optical neural network device 10 includes multiple diffractive optical networks 14A, 14B. A beam splitter 38 splits the input optical image, signal, or data 12 into two different optical paths. While two different diffractive optical network device 10 are illustrated in FIG. 1D it should be appreciated that more than two (2) such diffractive optical networks 14A, 14B may be employed. Moreover, the outputs 30A, 30B of each diffractive optical network 14A, 14B may project the diffracted or reflected image/signal/data onto different sensor planes or surfaces or the same sensor plane or surface. These are optimized for the different detection schemes (e.g., positive/negative as explained herein) and are optically de-coupled from one another.

As seen in FIG. 1D, there are two separate diffractive optical networks 14A, 14B each having their own substrate layers 16 which may be held in respective holders 18. The two optical paths are optically isolated from one another and the respective output image, signal or data 30A, 30B are sent to two different sets of optical sensors 32 (e.g., those seen in FIGS. 1E, 1F, 1G) which, as illustrated, may be arranged in respective sensor arrays 33A, 33B. Note that the sensor arrays 33A, 33B are located at different optical planes but in other embodiments these may be the same optical plane. The optical sensors 32 that are part of the sensors arrays 33A, 33B are, as in the embodiment of FIG. 1A, coupled to circuitry 34 that is used to perform a differential operation on groups of optical sensors 32 as explained herein. For example, the differential amplifier circuit 34 of FIG. 1C is used to generate an output 35 that is the signal difference between the inputs from the negative sensor 32n and the positive sensor 32p within a particular group. As explained herein, in one embodiment the final output or classification 40 is based on identifying the particular optical sensor 32 group where the normalized signal difference is maximized. That is to say, the particular group of optical sensors 32 is identified that has the largest normalized signal difference. This group of optical sensors 32 is associated with a particular classification which is then output 40.

Figure 1E:
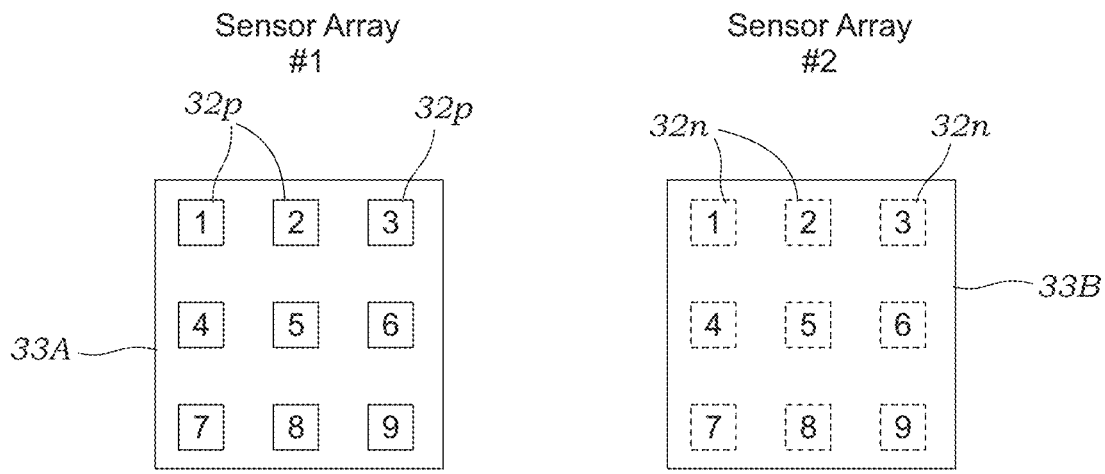
FIG. 1E illustrates the one configuration (differential configuration) of the detector array according to one embodiment.
Figure 1F:
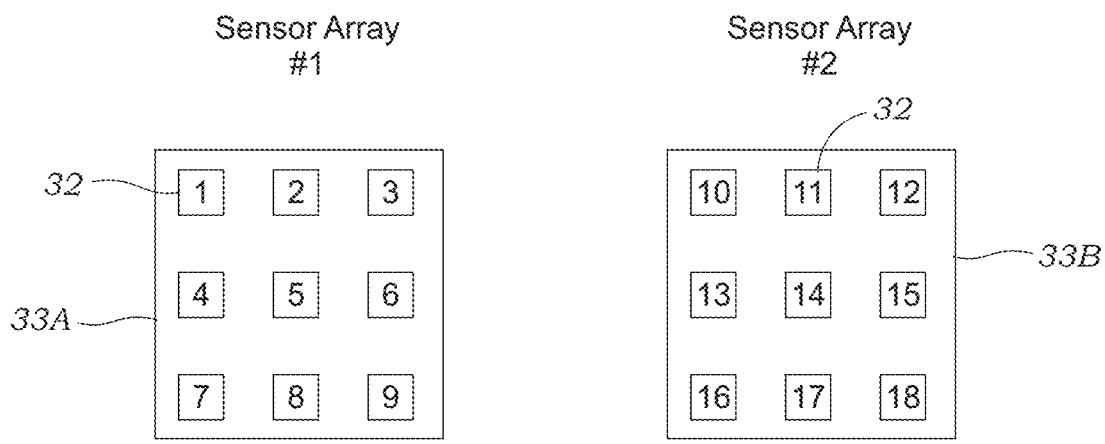
FIG. 1F illustrates the one configuration (class-specific configuration) of the detector array according to one embodiment.
Figure 1G:
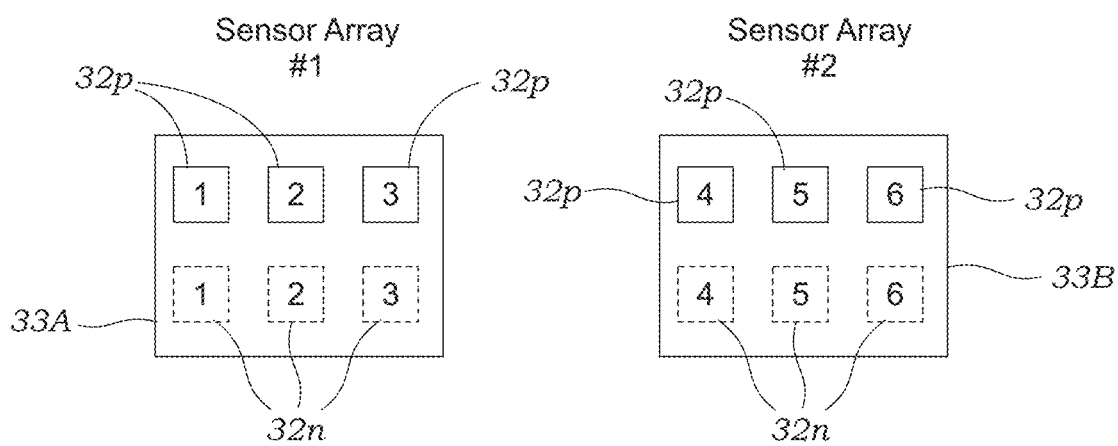
FIG. 1G illustrates the one configuration (class-specific differential configuration) of the detector array according to one embodiment.

FIG. 1E illustrates one embodiment of first and second optical sensor arrays 33A, 33B. In this embodiment, the positive optical sensors 32p are located on the first optical sensor array 33A while the negative optical sensors 32n are located on the second optical sensor array 33B. Thus, in this embodiment, the positive optical sensors 32p are optically isolated form the negative optical sensors 32n. In the embodiment of FIG. 1E, there are nine (9) groups of optical sensors 32 which correspond to nine (9) classifications. FIG. 1F illustrates another embodiment of first and second optical sensors arrays 33A, 33B. In this embodiment, there are eighteen (18) optical sensors that correspond to eighteen (18) different classes. Note that in this embodiment, all of the optical sensors 32 are positive and there are no negative optical sensors 32. FIG. 1G illustrates another embodiment of first and second optical sensors arrays 33A, 33B (see also FIG. 2D). In this embodiment, there are six (6) groups of optical sensors 32 which correspond to six (6) classifications. In this embodiment, the pairs of positive optical sensors 32p and negative optical sensors 32n for the same class are located on the same optical sensor array 33A, 33B.

Figure 1H:
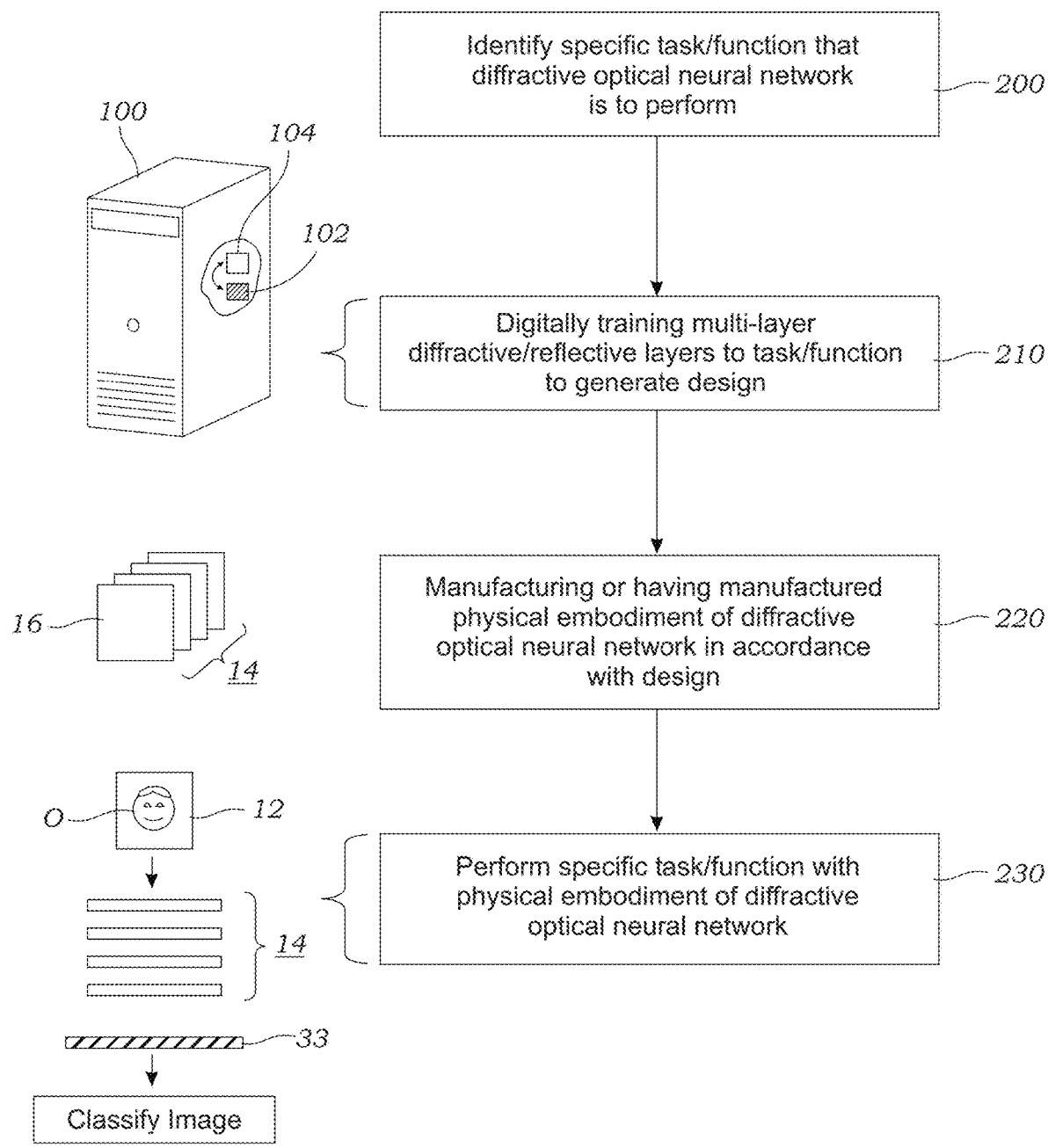
FIG. 1H illustrates a flowchart of operations used to design and use a diffractive optical neural network according to one embodiment.

FIG. 1H illustrates a flowchart of the operations or processes according to one embodiment to create and use diffractive optical neural network device 10. As seen in operation 200 of FIG. 1H, a specific task/function is first identified that the diffractive optical neural network device 10 will perform. This may include classification of one or more objects (O) contained in an input image 12 or classification of the image 12 itself. For example, a classification scheme may classify images run through system as a natural setting (e.g., forest or mountains) or a non-natural setting. The system may further be used to tag or identify certain features within the classified image. The task or function may also include performing one or more imaging operations (e.g., image magnification, enhance spatial features of the object O, improved resolution, feature highlighting, image feature tagging, etc.). In the particular example illustrated in FIG. 1H, the task/function is to take the input image 12 and classify the object O as a face (i.e., classification of object). Once the task or function has been established, a computing device 100 having one or more processors 102 executes software 104 thereon to then digitally train a model or mathematical representation of multi-layer diffractive or reflective substrate layers 16 to the desired task or function to then generate a design for a physical embodiment of the diffractive optical neural network device 10. This operation is illustrated as operation 210 in FIG. 1H. The design has the physical layout for the different physical features 20 that form the artificial neurons in each of the plurality of substrate layers 16 which are present in the diffractive optical neural network device 10 may then be used to make a physical embodiment that reflects the computer-derived design. Operation 220 reflects that the design is used to manufacture or have manufactured the physical embodiment of the diffractive optical neural network device 10 in accordance with the design. The design, in some embodiments, may be embodied in a software format (e.g., SOLIDWORKS® software, AUTOCAD® software, INVENTOR® software, or other computer-aided design (CAD) program or lithographic software program) may then be manufactured into a physical embodiment that includes the plurality of substrate layers 16. The physical substrate layers 16, once manufactured may be mounted or disposed in a holder 18 such as that illustrated in FIGS. 1A and 1D. The holder 18 may include a number of slots formed therein to hold the substrate layers 16 in the required sequence and with the required spacing between adjacent layers (if needed). Once the physical embodiment of the diffractive optical neural network device 10 has been made, the diffractive optical neural network device 10 is then used to perform the specific task or function as illustrated in operation 230 of FIG. 1H.

Experimental

Figure 2C:
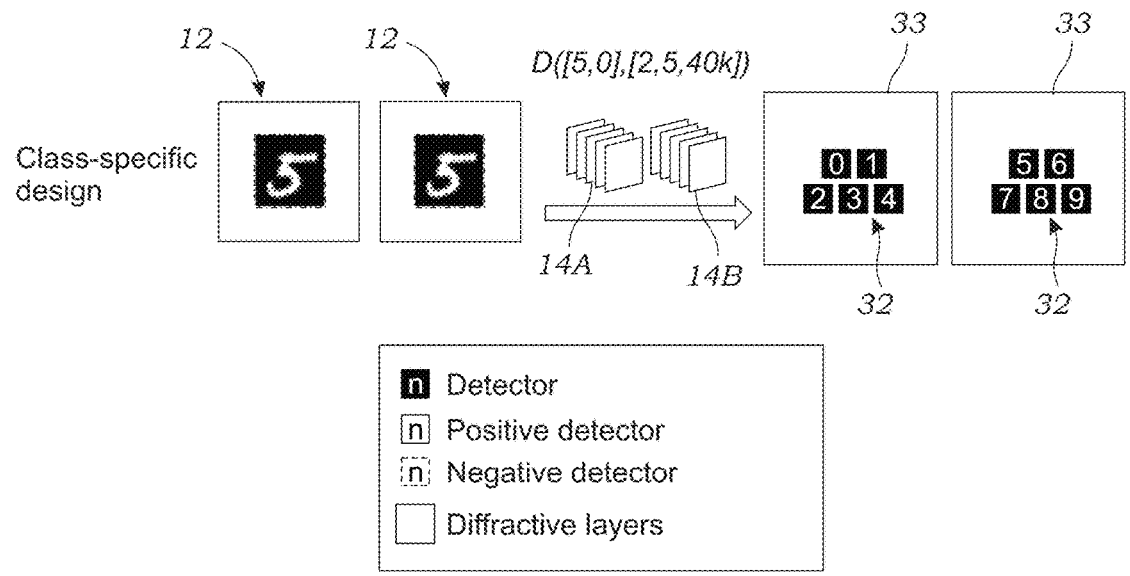
Figure 2D:
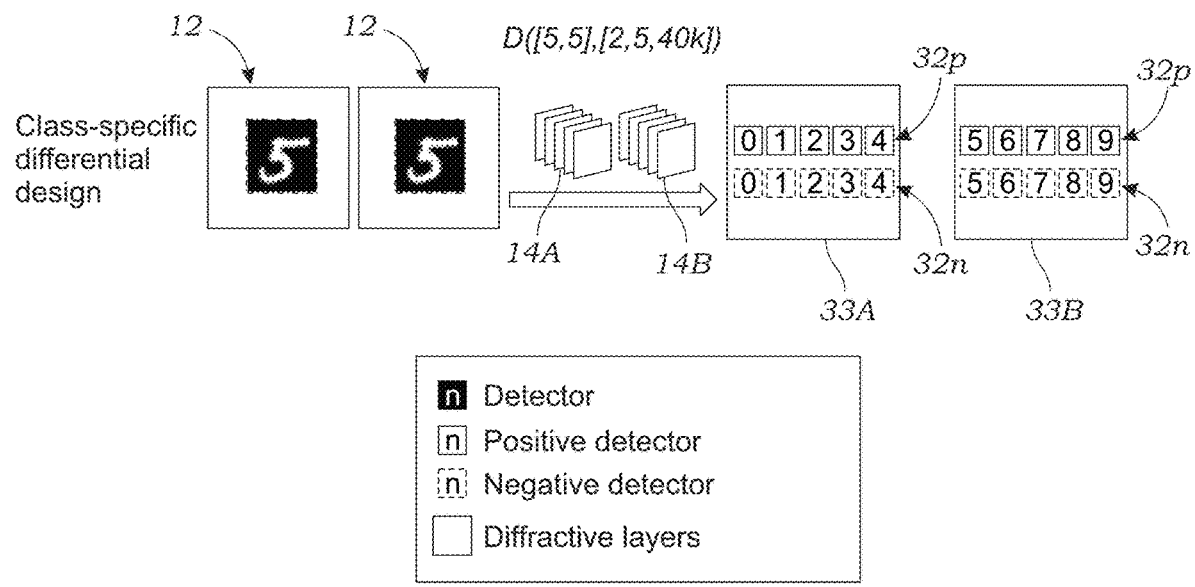

FIGS. 2A-2D shows the examples of the input-output plane configurations for various diffractive neural network designs investigated and compared herein. For the sake of clarity, a notation was devised to represent these different optical network designs based on (1) the number of positive and negative sensors/detectors at the output plane, (2) the number of jointly-trained but independent diffractive networks (i.e., there is no electromagnetic coupling among individual diffractive networks), (3) the number of layers constituting each one of these individual diffractive neural networks, and (4) the number of neurons at each diffractive layer of an individual optical network. According to this notation, if a diffractive optical classifier has $Q^+$ positive sensors/detectors 32p, $Q^-$ negative sensors/detectors 32n at each output plane of N jointly-optimized diffractive networks 14, each of which contains L layers 16 with P neurons per layer, this optical classifier design is denoted by D([$Q^+$, $Q^-$], [N,L,P]). If the $Q^+$ positive sensors/detectors 32p and $Q^-$ negative sensors/detectors 32n are not at the same diffractive network output plane, i.e., decoupled from each other by distributing them to different optical neural networks 14, then the total number of jointly-optimized diffractive networks needs to be doubled to 2×N, where each network will either have $Q^+$ or $Q^-$ sensors/detectors 32 at the corresponding output plane. To reflect such a configuration, this notation is defined as D([$Q^+$][$Q^-$],[2N,L,P]) where the brackets separating the number of positive and negative sensors/detectors 32p, 32n indicate that they are not placed on the same output plane, but rather they follow different diffractive optical networks 14 that are all jointly-optimized, but operate individually without optical coupling from others. According to this notation, the standard diffractive optical neural network architectures (FIG. 2A) can be denoted as D([M,0],[1,L,P]) for a dataset with M classes (e.g., M=10 for MNIST). FIG. 2C illustrates a class-specific design (non-differential) that has two optical paths and two sensor/detector arrays. As another example, for a dataset with M classes, a combination of class division and differential detection can lead to 2×M jointly-trained diffractive neural networks, with a single sensor/detector 32 at the output plane of each diffractive network 14 (corresponding to either positive or negative portion of a class signal), and this diffractive neural system is denoted, based on the notation, as: D([1][1],[2M,L,P]).

After the introduction of the notation to symbolize different diffractive neural systems (D), one can now focus on quantifying the impact of some of these different designs on the inference and generalization performance of a diffractive classifier. First, one can start the analysis by comparing the performance of standard diffractive optical networks used earlier (e.g., FIG. 2A), where there is a single optical network with M=10 sensors/detectors at the output plane (e.g., D([10,0],[1,5,40 k])), against the performance of a differential detection network with the same diffractive configuration, except the output plane, i.e., D([10,10],[1,5, 40 k]) (FIG. 2B). Table 1, first and second rows reveal that maximizing the normalized differential signal for the target class improves the blind inference accuracy of a diffractive optical network (composed of 5 diffractive layers with a total of 0.2 Million neurons) to 98.54%, 90.54% and 48.51% for MNIST, Fashion-MNIST and grayscale CIFAR-10 datasets, respectively, compared to the corresponding accuracies achieved by D([10,0],[1,5,40 k]), i.e., 97.51%, 89.85% and 45.20%, respectively.

TABLE 1

| Architecture | MNIST | Fashion | CIFAR-10 (grayscale) |
|---|---|---|---|
| D([10, 0], [1, 5, 40k]) | 97.51 ± 0.03 | 89.85 ± 0.18 | 45.20 ± 0.35 |
| D([10, 10], [1, 5, 40k]) | 98.54 ± 0.03 | 90.54 ± 0.16 | 48.51 ± 0.30 |
| D([10][10], [2, 5, 40k]) | 98.49 ± 0.03 | 90.94 ± 0.16 | 49.10 ± 0.30 |

Table 1. Blind testing classification accuracies of non-differential (top row) and differential diffractive optical networks, without any class specificity or division. M=10 classes exist for each dataset: MNIST, Fashion MNIST and gray-scaled CIFAR-10. For each data point, the training of the corresponding diffractive optical neural network model was independently repeated six (6) times using the same initial parameters but with random batch sequences; therefore, each data point reflects the mean accuracy of these six (6) trained networks, also showing the corresponding standard deviation.

For a dataset with M classes, this performance gain comes at the expense of a 2-fold increase in the number of opto-electronic sensors/detectors 32 (2M instead of M), together with the use of additional but simple electronic read-out circuitry 34, composed of e.g., M differential amplifiers and normalization logic; this extra computation at the output plane is rather straight-forward, with a computational complexity of O(M).

Figure 4A:
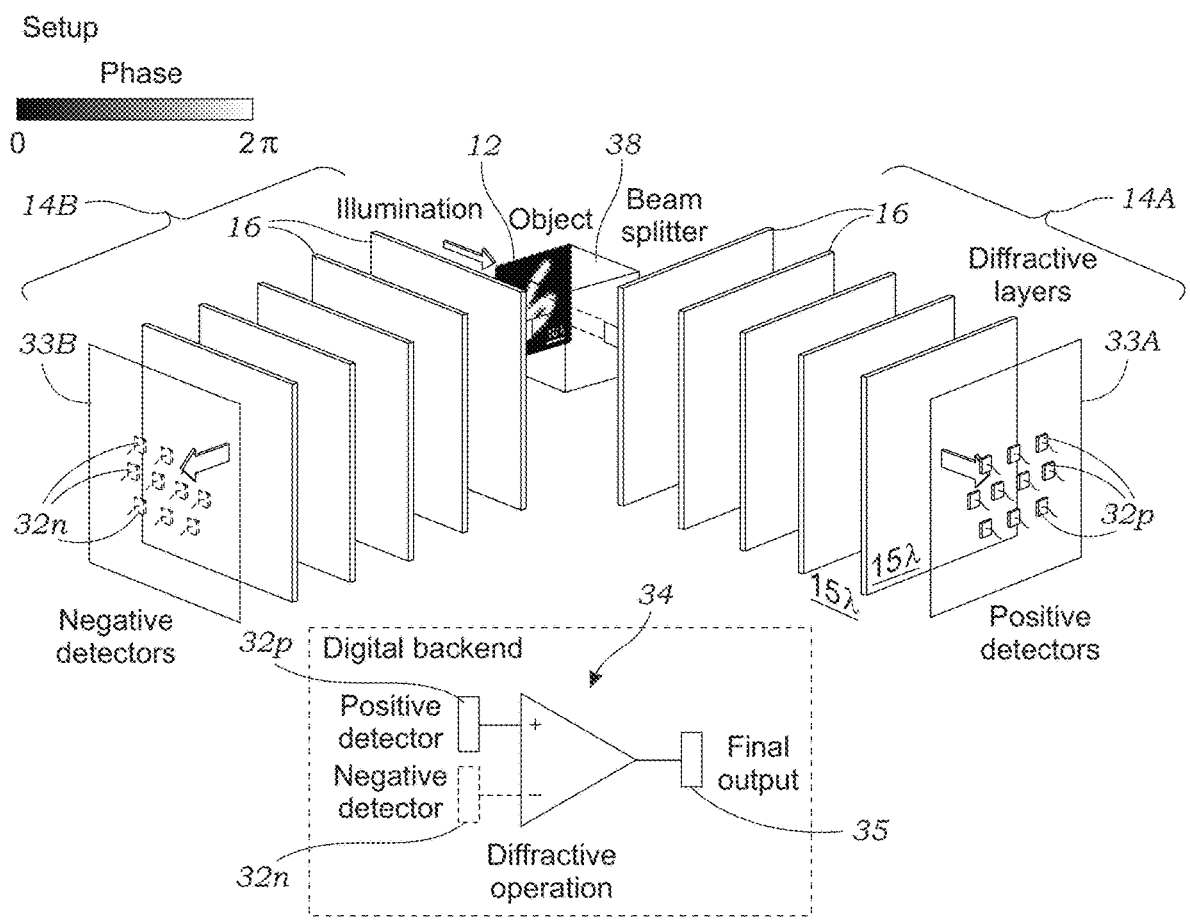
FIG. 4A illustrates the setup of the diffractive optical neural network using differential detection scheme, where the positive and the negative sensors/detectors are split into two jointly-optimized networks based on their sign D([M][M],[2,L,P]). In the example shown in FIG. 4A, M=10, L=5, P=40 k.
Figure 4B:
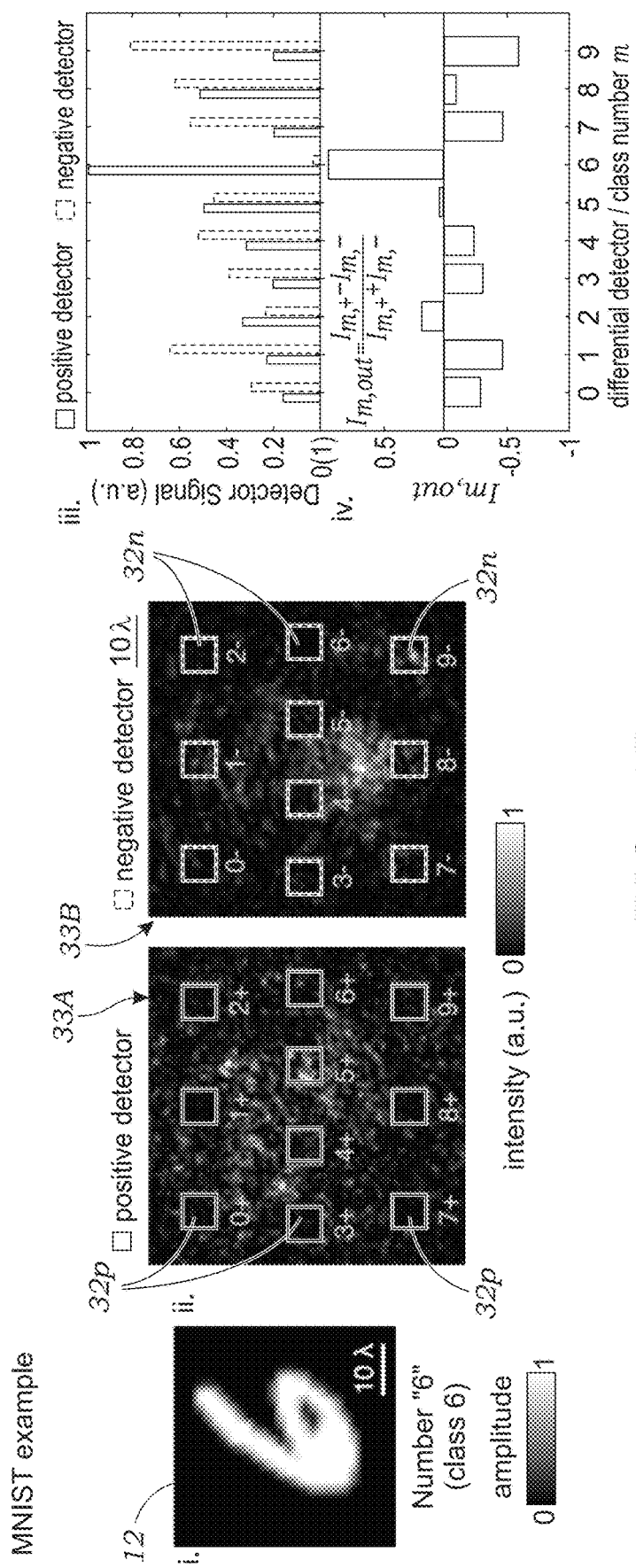
FIG. 4B illustrates how the diffractive optical neural network of FIG. 4A correctly classified test object from the MNIST dataset is shown. Subparts of FIG. 4B illustrate the following: i. Target object placed at the input plane and illuminated by a uniform plane wave, ii. Normalized intensity distribution observed at the output plane of the diffractive optical neural network, iii. Normalized optical signal detected by the positive (left) sensors/detectors and the negative (right) sensors/detectors, iv. Differential class scores computed according Eq. (1) using the values in (iii).
Figure 4C:
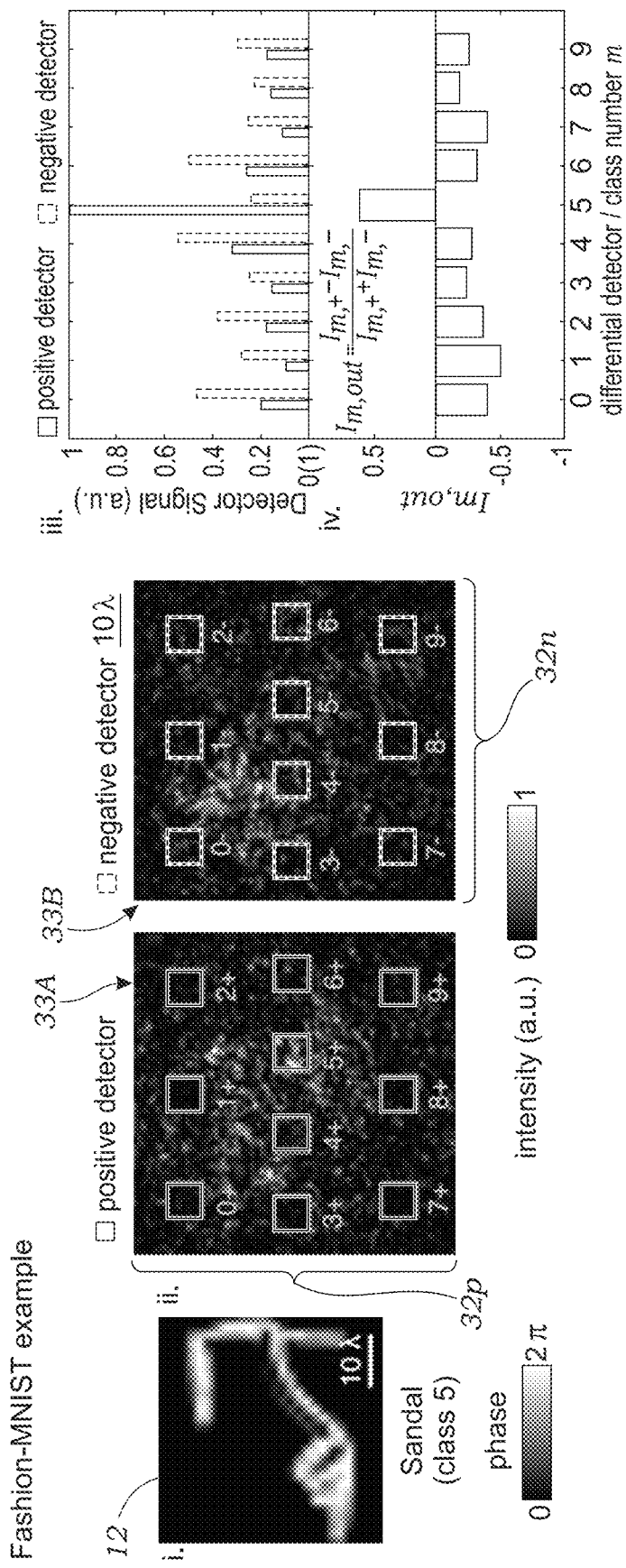
FIGS. 4C and 4D are same as in FIG. 4B, except for Fashion-MNIST and CIFAR-10 datasets, respectively. Note that while the input object in FIG. 4B is modeled as an amplitude-encoded object, the gray levels shown in FIG. 4C and FIG. 4D represent phase-encoded perfectly transparent input objects.
Figure 4D:
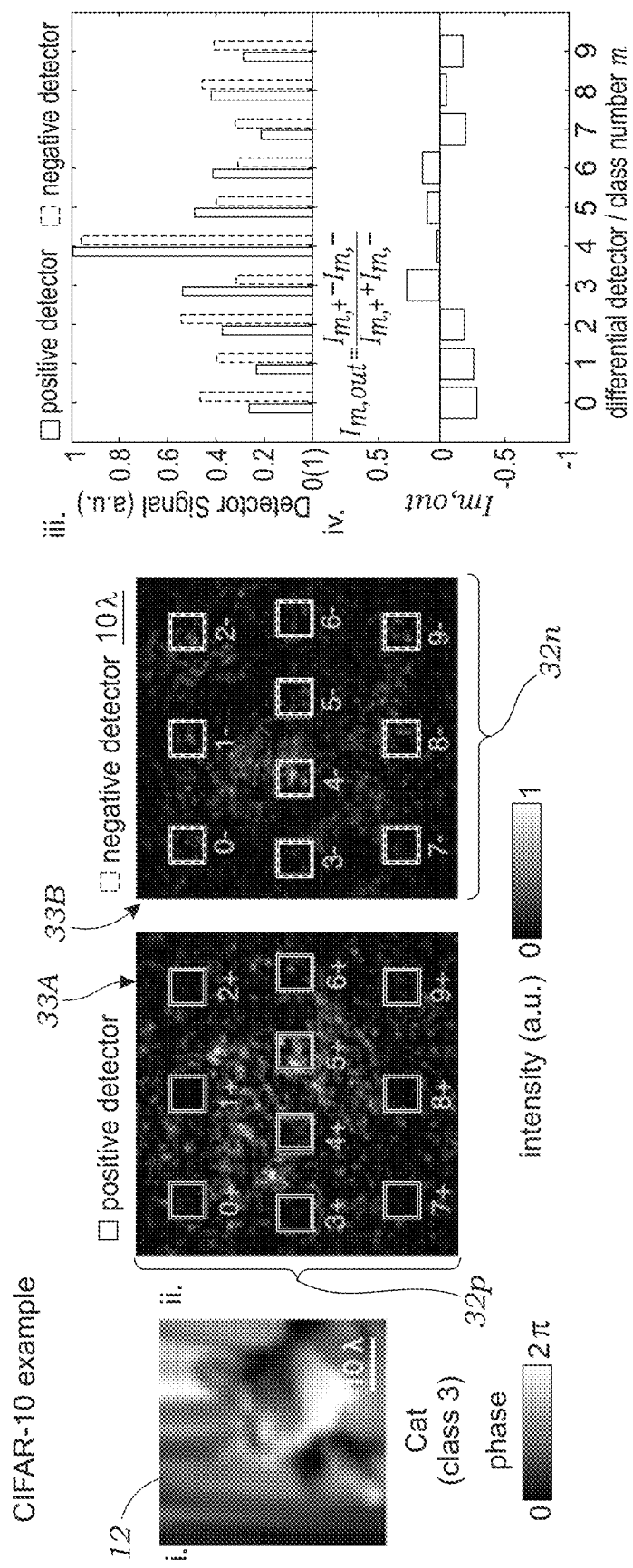
Figure 5A:
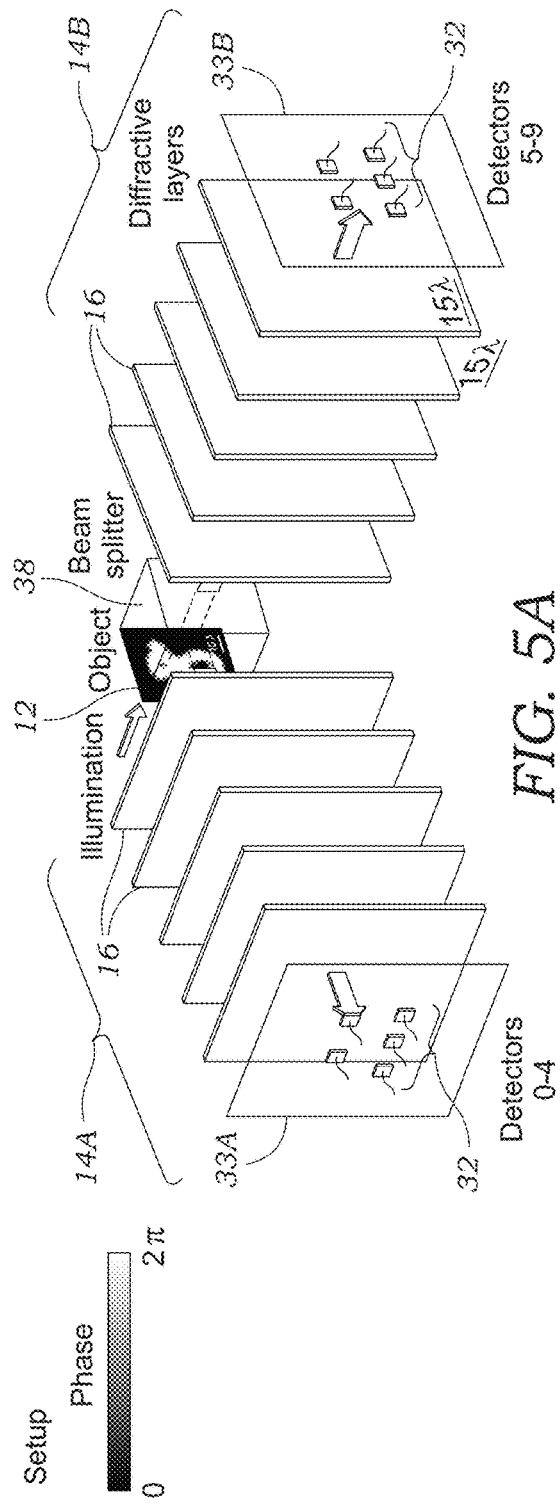
FIGS. 5A-5D illustrate the operation principles of a diffractive optical neural network using class-specific detection scheme, where the individual class sensors/detectors are split into two networks based on their class. Unlike FIGS. 3A-3D and 4A-4D there are no negative sensors/detectors in this design.
Figure 5B:
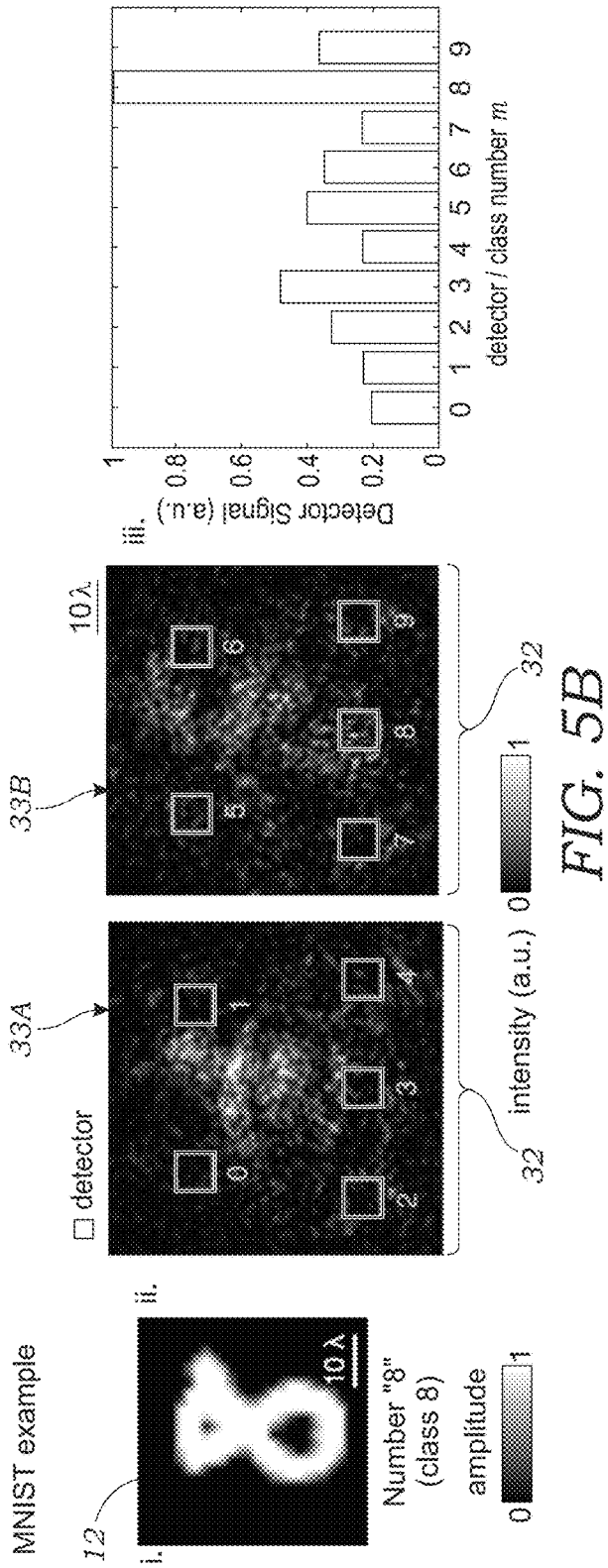
Figure 5C:
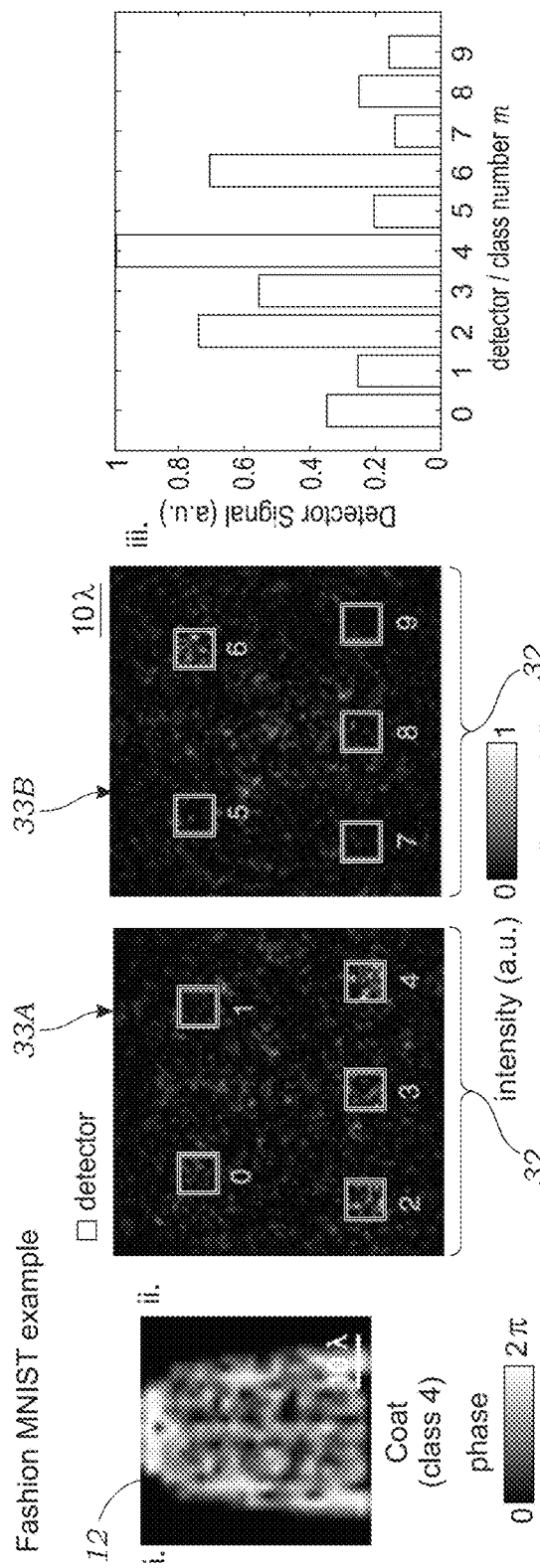
Figure 5D:
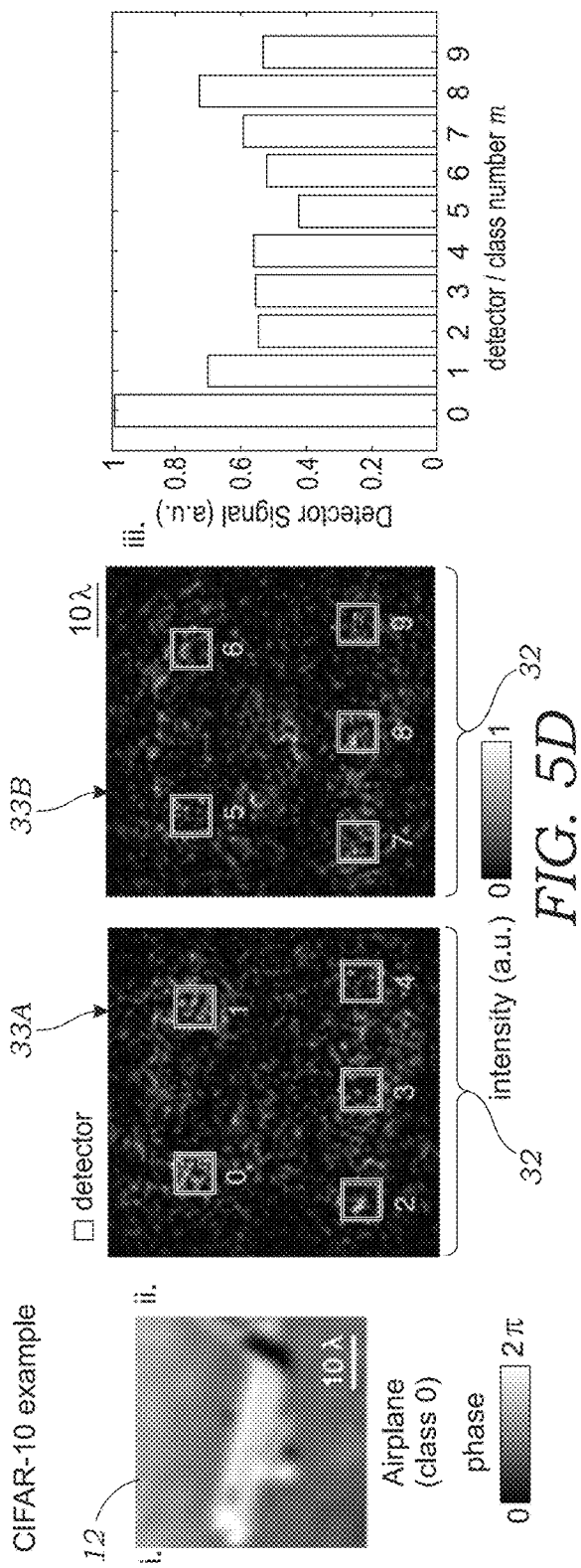

When the optical path is divided into two as shown in FIG. 4A, the number of degrees of freedom of the diffractive neural device/system 10 is further increased and decouple the optical signals detected by the positive and negative detector pairs 32p, 32n; as a result of this, the blind testing accuracy of D([10][10],[2,5,40 k]) shown in FIG. 4A increases further to 90.94% and 49.10% for Fashion-MNIST and CIFAR-10 datasets, respectively as shown in the last row of Table 1. For MNIST dataset, on the other hand, the average performance of D([10][10],[2,5,40 k]) remains approximately at the same level as D([10,10],[1,5,40 k]) architecture, i.e., 98.49% vs. 98.54%, respectively.

Table 2 summarizes the results on an alternative diffractive classifier design strategy: a jointly-trained a group of diffractive neural networks 14 was used, where each one of them specialized on a sub-group of classes, and the opto-electronic sensors/detectors 32 were placed at the output plane of the corresponding network. For example, as part of this design strategy, D([2,0],[5,5,40 k]) of Table 2 refers to a diffractive neural device/system 10 that is composed of five (5) jointly-trained diffractive neural networks 14A, 14B, each having five (5) diffractive layers (40 k neurons per layer) and two (2) sensor/detector arrays 33 are placed at the corresponding output plane, where each sensor/detector 32 represents one class of the dataset. Each one of these five (5) diffractive neural networks is jointly-optimized together with the others, but does not have any optical coupling from the other networks. Based on the comparative analysis reported in Table 2 (non-differential row), the best performance among the non-differential diffractive designs is achieved when each diffractive optical network of a neural system specializes on only one class: D([1,0],[10,5,40 k]) achieved blind testing accuracies of 97.61%, 90.34% and 48.02%, for MNIST, Fashion-MNIST and grayscale CIFAR-10 datasets, respectively. The same conclusion regarding the success of class-specific diffractive neural networks also holds for differential detection strategy; Table 2 (differential rows) reports that D([1,1],[10,5,40 k]) and D([1][1],[20,5,40 k]) achieved the winner performance in this comparison for each differential row, with blind testing accuracies of 98.59% (98.52%), 91.37% (91.48%) and 50.09% (50.82%), for MNIST, Fashion-MNIST and grayscale CIFAR-10 datasets, respectively, where the values in parentheses refer to the performance of D([1][1],[20,5,40 k]).

TABLE 2

| Type | Architecture | MNIST | Fashion | CIFAR-10 (grayscale) |
|---|---|---|---|---|
| Class-specific Non-differential D([M/N, 0], [N, L, P]) N > 1 | D([5, 0], [2, 5, 40k]) | 97.53 ± 0.08 | 90.19 ± 0.14 | 46.37 ± 0.35 |
| | D([2, 0], [5, 5, 40k]) | 97.57 ± 0.07 | 90.14 ± 0.16 | 47.05 ± 0.16 |
| | D([1, 0], [10, 5, 40k)) | 97.61 ± 0.08 | 90.34 ± 0.08 | 48.02 ± 0.70 |
| Class-specific Differential D([M/N, M/N], [N, L, P]) N > 1 | D([5, 5], [2, 5, 40k]) | 98.50 ± 0.09 | 90.89 ± 0.24 | 49.09 ± 0.24 |
| | D([2, 2], [5, 5, 40k]) | 98.57 ± 0.06 | 91.08 ± 0.25 | 49.68 ± 0.17 |
| | D([1, 1], [10, 5, 40k]) | 98.59 ± 0.03 | 91.37 ± 0.19 | 50.09 ± 0.23 |
| Class-specific Differential D([M/N][M/N], [2N, L, P]) N > 1 | D([5][5], [4, 5, 40k]) | 98.51 ± 0.08 | 91.04 ± 0.22 | 49.82 ± 0.38 |
| | D([2][2], [10, 5, 40k]) | 98.58 ± 0.06 | 91.36 ± 0.13 | 50.47 ± 0.63 |
| | D([1][1], [20, 5, 40k]) | 98.52 ± 0.05 | 91.48 ± 0.03 | 50.82 ± 0.26 |

Table 2. Blind testing classification accuracies of different class division architectures combined with non-differential and differential diffractive neural network designs. M=10 classes exist for each dataset: MNIST, Fashion MNIST and grayscale CIFAR-10. For each data point, the training of the corresponding diffractive optical neural network model was independently repeated six (6) times using the same initial parameters but with random batch sequences; therefore, each data point reflects the mean accuracy of these six (6) trained networks, also showing the corresponding standard deviation.

A direct comparison between the 'Differential' and 'Non-differential' rows of Table 2 further emphasizes the importance of the differential detection scheme. Not only the differential diffractive network designs (e.g., FIGS. 3A-3D and 4A-4D) show significantly better performance compared to their non-differential counterparts when the number of neurons and the number of diffractive layers are the same, but even D([1,0],[10,5,40 k]) architecture with 2 Million neurons in total cannot outperform D([10,10],[1,5,40 k]) that has 0.2 Million neurons in total, despite having ten (10) times more number of neurons in the diffractive classifier design.

Figure 6A:
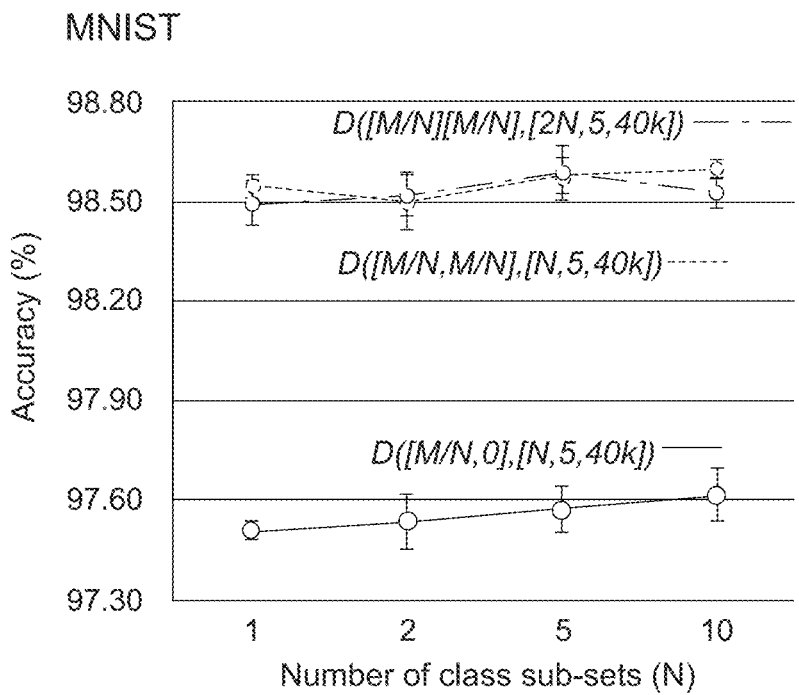
FIGS. 6A-6C illustrate the performance comparison of different diffractive neural network systems as a function of N, the number of class sub-sets. M=10 classes exist for each dataset: MNIST (FIG. 6A), Fashion MNIST (FIG. 6B) and grayscale CIFAR-10 (FIG. 6C). Based on the notation, N=M=10 refers to a jointly-optimized diffractive neural network system that specializes to each one of the classes separately. These results confirm that class-specific differential diffractive neural networks (D([M/N][M/N],[2N,L,P]) for N>1) outperform other counterpart diffractive neural network designs. For each data point, the training of the corresponding diffractive optical neural network model was repeated six (6) times using the same initial parameters but with random batch sequences; therefore, each data point reflects the mean accuracy of these six (6) trained networks, also showing the corresponding standard deviation.
Figure 6B:
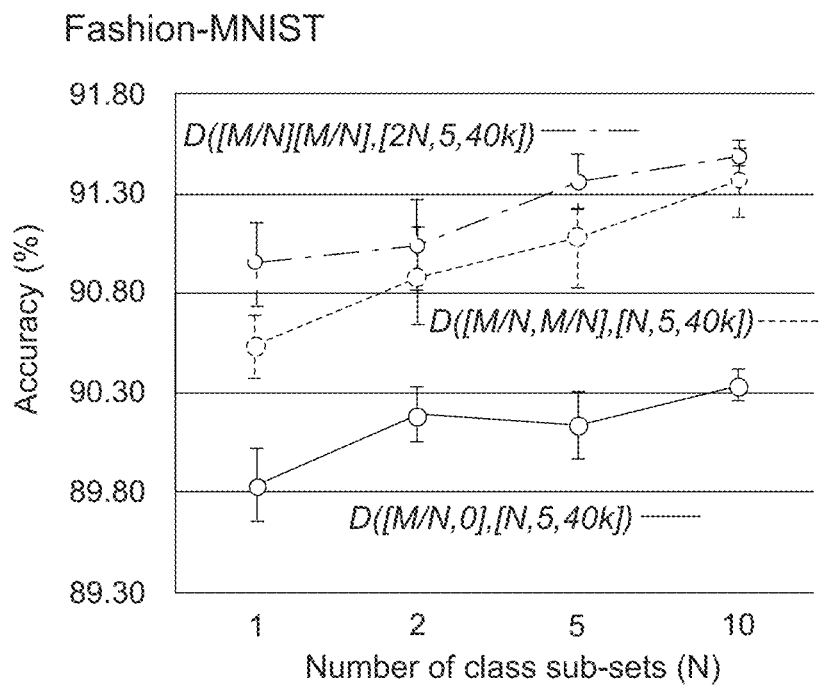
Figure 6C:
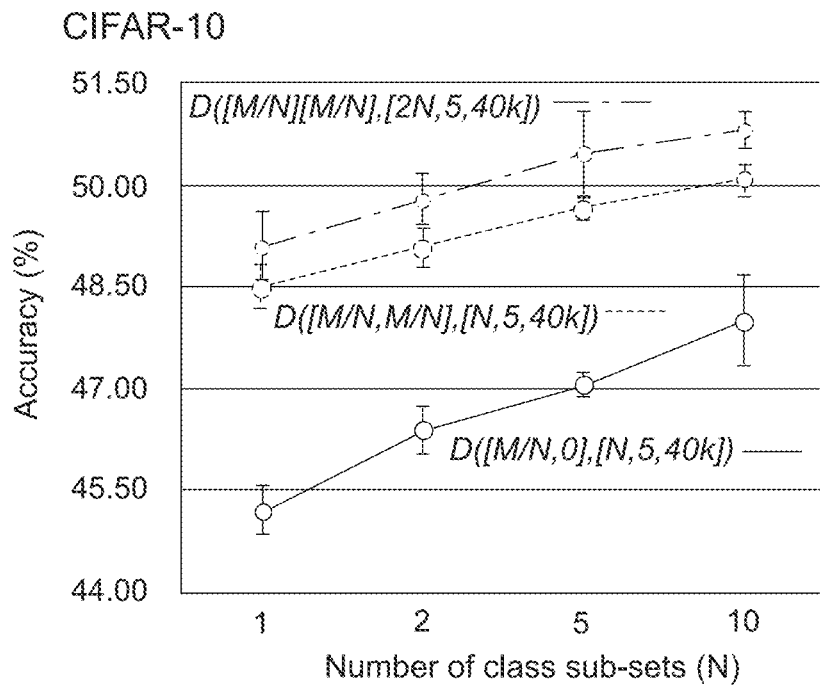

FIGS. 6A-6C summarizes the general conclusions that are revealed by the analysis: (1) differential diffractive neural systems 10 outperform their non-differential counterparts; (2) diffractive neural networks 10 that sub-specialize on a single class as part of a neural system outperform their counterparts that specialize on multiple classes per diffractive network; and (3) the combination of both design strategies, i.e., class-specific differential detection outperforms other counterpart diffractive neural system designs. These mean that for a dataset with M classes, D([1][1],[2M,L,P]) would be a winner design, with L diffractive layers 16 per class-specific optical network, and P neurons per diffractive layer (see Tables 2,3). For example, Table 2 reports that, for MNIST, Fashion-MNIST and grayscale CIFAR-10 datasets, D([1][1],[2M=20,5,40 k]) design achieves blind testing accuracies of 98.52%, 91.48% and 50.82%, respectively; it is believed that these values report the highest accuracy levels achieved so far for an all-optical neural network design.

So far, in the differential diffractive neural network designs, one considered balanced differential detection between the optical signals of [$Q^+$] and [$Q^-$], i.e., [$Q^+$]−[$Q^-$]. To further explore if this balanced differential detection is indeed an ideal choice, a more general case was considered, where the two sensors/detectors 32$p$, 32$n$ of a pair assigned to a class can be merged with arbitrary scaling factors, $p_m$ and $n_m$, respectively (m represents the class number). One can generally denote this broader diffractive network design as: D($p_m$[M/N] $n_m$[M/N],[2N,L,P]), where $p_m$ and $n_m$ can be any real number that can vary from class to class. For example, $p_m$=$n_m$=1 refers to the standard balanced differential detection case considered so far, whereas $p_m$=1, $n_m$=−1 case refers to a simple summation of the signals of the two sensors/detectors assigned to class m. By treating $p_m$ and $n_m$ as additional independent learnable parameters of a diffractive neural network, D($p_m$[M/N] $n_m$[M/N],[2N,L,P]), different designs were trained that were initialized with random ($p_m$, $n_m$) values, which quickly converged to a solution with $p_m \approx n_m$ for each class of the corresponding dataset, proving empirically that a balanced differential detection is indeed preferred. It was noticed that the general design D($p_m$[M/N] $n_m$[M/N],[2N,L,P]) with learnable detector coefficients did not improve the blind inference performance compared to the case of $p_m$=$n_m$=1. Of course, in other embodiments, different scaling factors may be used among the different groups of optical sensors/detectors 32$p$, 32$n$.

Another method to benefit from the parallel computing capability of passive diffractive neural networks is to create independently-optimized diffractive neural networks that optically project their diffracted light onto the same output/detector plane. Unlike the jointly-optimized diffractive neural systems described earlier, here in this alternative design strategy a diffractive network design was selected, D, and independently optimize replicas of this design, where each network separately projects its diffracted pattern onto the same (i.e., common) optical sensor/detector plane. Not to interfere with the inference results of each diffractive neural network 14, the intensity-only summation of the optical signals of each diffractive network 14 at the common output plane was considered, as opposed to coherent summation of the diffracted fields, which could perturb the predictions of each independent network due to constructive and destructive interference at the output plane. This can easily be achieved in a diffractive neural device/system 10 by adjusting the relative optical path length differences between the individual diffractive networks to be larger than the temporal coherence length imposed by the bandwidth of the illumination source, ensuring that each detector at the common output plane sums up the optical intensities of all the individual diffractive neural networks. For each diffractive network of the ensemble, coherent operation is still maintained since the layer-to-layer separation in a given diffractive network 14 is very small (e.g., 40$\lambda$ for the designs considered herein).

Figure 7A:
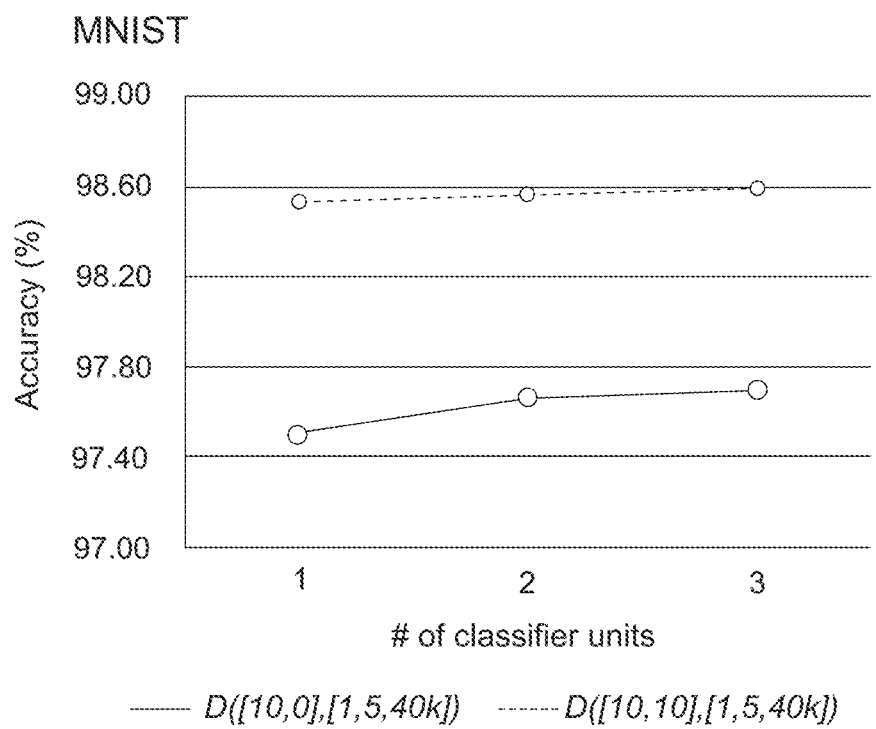
FIGS. 7A-7C illustrate the comparison between the classification accuracies of ensemble models formed by 1, 2 and 3 independently-optimized diffractive neural networks that optically project their diffracted light onto the same output/detector plane. Bottom and top curves represent D([10,0], [1,5,40 k]) and D([10,10],[1,5,40 k]) designs, respectively.
Figure 7B:
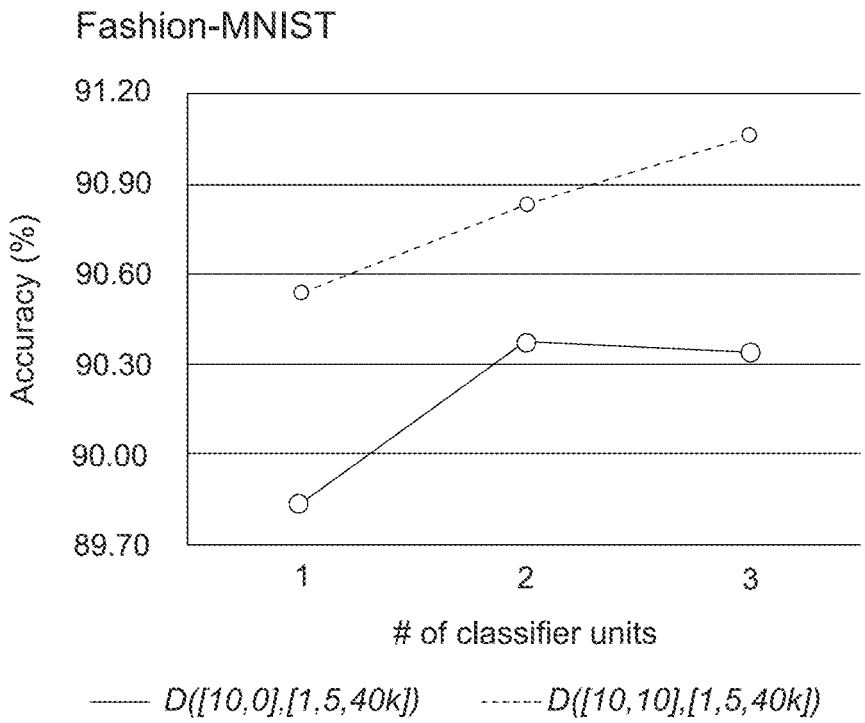
Figure 7C:
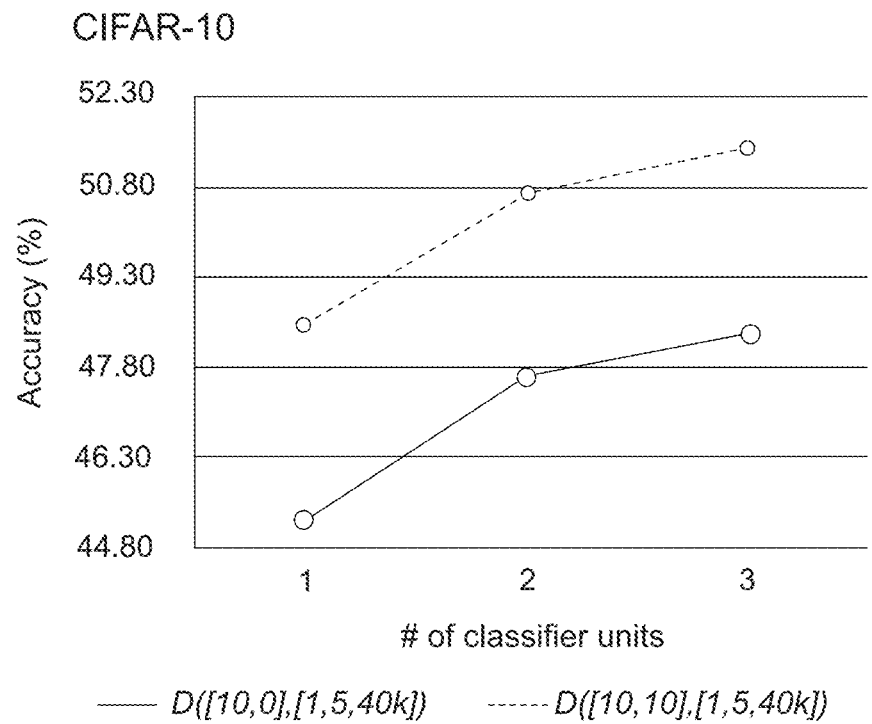

FIGS. 7A-7C summarizes the blind testing accuracies achieved by this strategy using either non-differential or differential diffractive neural networks, i.e., D([10,0],[1,5,40 k]) or D([10,10],[1,5,40 k]). For example, using three (3) independently-optimized differential diffractive neural networks 14 that optically project their light onto a common output plane with 10 detector pairs (one for each class), blind testing accuracies of 98.59%, 91.06% and 51.44% were numerically achieved for MNIST, Fashion-MNIST and grayscale CIFAR-10 datasets, respectively (see FIGS. 7A-7C). Further increasing the number of independently-trained differential diffractive neural networks 14 combined in an ensemble system brings diminishing return to the inference performance of the ensemble. For example, for CIFAR-10 dataset, optical classifier models that are composed of 2, 3 and 5 independently-optimized differential diffractive neural networks, D([10,10],[1,5,40 k]), achieve blind testing accuracies of 50.68%, 51.44% and 51.82%, respectively. This diminishing return behavior stems from the increasing correlation between the output intensity distributions generated by the ensemble model and an additional independently-optimized diffractive neural network (to be added to the ensemble).

After reporting the results of various different design strategies for diffractive neural networks, Table 3 presents a comparison of diffractive neural systems against some of the earlier hybrid (i.e., optical and electronic) neural networks as well as some of the widely-known all-electronic machine learning models used in the literature. This comparison once again highlights the importance of class-specific differential detection for improving the blind inference performance and the generalization of diffractive neural network systems. For example, D([1][1],[20,5,40 k]) matches the blind inference performance of convolutional deep neural networks such as LeNet and AlexNet for MNIST and Fashion-MNIST datasets, and falls short of the performance of LeNet for CIFAR-10 dataset only by 4.39%. A similar conclusion can be drawn from Table 3 for the comparison against the hybrid systems reported in D. Mengu et al., "Analysis of Diffractive Optical Neural Networks and Their Integration With Electronic Neural Networks," in IEEE Journal of Selected Topics in Quantum Electronics, vol. 26, no. 1, pp. 1-14, January-February 2020, Art no. 3700114 and J. Chang et al., "Hybrid optical-electronic convolutional neural networks with optimized diffractive optics for image classification," *Sci. Rep.*, vol. 8, no. 1, p. 12324, August 2018.

TABLE 3

| Type | Network Architecture | MNIST (%) | Fashion (%) | CIFAR-10 (%) |
|---|---|---|---|---|
| Optical (Diffractive) | Standard design D([10, 0], [1, 5, 40k]) | 97.51 ± 0.03 | 89.85 ± 0.18 | 45.20 ± 0.35 |
| | Differential design D([10, 10], [1, 5, 40k]) | 98.54 ± 0.03 | 90.54 ± 0.16 | 48.51 ± 0.30 |

TABLE 3-continued

| Type | Network Architecture | MNIST (%) | Fashion (%) | CIFAR-10 (%) |
|---|---|---|---|---|
| | Ensemble of 3 differential designs D([10, 10], [1, 5, 40k]) | 98.59 | 91.06 | 51.44 |
| | Class-specific differential design D([1, 1], [10, 5, 40k]) | 98.59 ± 0.03 | 91.37 ± 0.19 | 50.24 ± 0.17 |
| | Class-specific differential design D([1][1], [20, 5, 40k]) | 98.52 ± 0.05 | 91.48 ± 0.03 | 50.82 ± 0.26 |
| Hybrid (Optical + Electronic) | D. Mengu et al. | 98.97 | 90.45 | — |
| | J. Chang et al. | — | — | 51.00 ± 1.40 |
| Electronic | SVM | 91.90 | 83.20 | 37.13 |
| | LeNet | 98.77 | 90.27 | 55.21 |
| | AlexNet | 99.20 | 89.90 | 72.14 |
| | ResNet | 99.51 | 93.23 | 88.78 |

Table 3. Comparison of blind testing accuracies of different types of neural networks, including Optical, Hybrid and Electronic.

While the presented systematic advances in diffractive neural network designs have helped achieve a competitive inference performance, with classification accuracies that are among the highest levels achieved so far for optical neural networks, there is still a considerable performance gap with respect to the state-of-the-art all-electronic deep learning models such as ResNet (see e.g., Table 3, CIFAR-10 performance comparisons). Despite its inferior performance compared to such all-electronic deep learning models that set the state-of-the-art in machine learning, class-specific differential diffractive neural networks still present several important advantages in terms of scalability, memory usage, computation speed and power efficiency since the main computation occurs all-optically and at the speed of light through diffraction within passive optical layers without the need for external power, except for the illumination light and a few sensors/detectors 32 and related circuitry 34 at the network output. Having underlined these important advantages, one should also note that significantly higher classification accuracies of state-of-the-art electronic deep neural networks such as ResNet once again emphasize the vital role of multi-channel convolutional layers and non-linearity inherent in these networks; the use of nonlinear optical materials or optical resonances in diffractive neural networks can potentially improve the inference capabilities of diffractive neural systems beyond the currently presented results. The results also reinforce an earlier conclusion regarding diffractive optical neural networks: their inference and generalization capabilities improve with additional diffractive layers jointly-designed and optimized by gradient-based learning, which illustrate the depth feature of diffractive neural systems, even if there is no non-linear optical material being employed per layer. Stated differently, the general family of functions represented herein through D([M/N,M/N],[N,L,P]) or D([M/N][M/N],[2N,L,P]) cannot be covered by a single diffractive optical layer, no matter how many neurons are employed.

Finally, it should be emphasized that these reported advances in the inference and generalization performance of class-specific differential diffractive neural networks come at the cost of a requirement to increase the input illumination power. For example, to keep the signal to noise ratio (SNR) of each photodetector that is positioned at an output plane of a class-specific differential diffractive neural network system, (e.g., D([M/N,M/N],[N,L,P])) at the same level as the SNR of the photodetectors of a standard diffractive neural network (i.e., D([M,0],[1,L,P])), the optical power of the input illumination beam must be increased by approximately N fold; the exact comparison is dataset and task dependent, and is actually governed by the photon efficiencies of different diffractive networks that make up of D([M/N,M/N],[N,L,P]). However, if N is increased to M (e.g., M=10 for the datasets considered in this work), this means each diffractive network unit that is part of D([M/N,M/N],[N,L,P]) has only two (2) photodetectors 32 at the corresponding output plane, whereas the standard diffractive neural network, D([M,0],[1,L,P]), has M=10 photodetectors. Therefore, if one includes in the training phase of the diffractive neural system a photon efficiency loss term for the photodetectors of D([M/N,M/N],[N,L,P]), penalizing poor diffraction efficiency per sensor one can potentially reduce this N-fold illumination power penalty by making class-specific networks more photon efficient as they deal with much smaller number of photodetectors at their output. To list another disadvantage of class-specific differential diffractive neural networks, because of their increased parallelism, the complexity of the fabrication and alignment of the optical neural network set-up would be more complicated, and the overall size of the diffractive optical neural network 10 would be increased compared to a single standard diffractive neural network. However, these are challenges that can be mitigated with 3D integrated photonic systems fabricated through e.g., lithography, and the need for increased optical illumination power is in general not a major concern due to various high-power lasers commonly available in different formats, including portable systems.

Methods

Physical parameters of diffractive optical neural networks. The physical model of wave propagation, used in the forward model of diffractive neural networks, was formulated based on the Rayleigh-Sommerfeld diffraction equation and digitally implemented, using a computer, based on the angular spectrum method. See e.g., X. Lin et al., "All-optical machine learning using diffractive deep neural networks," Science, vol. 361, no. 6406, pp. 1004-1008, September 2018, which is incorporated by reference herein. According to this model, the neurons constituting the diffractive layers of an optical network can be interpreted as sources of modulated secondary waves. Assuming an illumination wavelength of $\lambda$, each neuron provides an adequately wide diffraction cone enabling communication with all the neurons of the consecutive layer, provided that the size of each neuron is taken as $\sim 0.5\lambda$, and the distances between the diffractive layers are set to be $\sim 40\lambda$. Diffractive optical neural networks designed based on these pre-determined (non-trainable) parameters are considered as fully-connected optical networks. In addition, the shape and size of each optical sensor/photodetector 32 at a given output plane of a diffractive network 24 were also fixed: it was assumed that square photodetectors 32 were used, each with a width of 6.4λ The form of the illumination, incident on the target objects, is assumed to be a uniform plane wave generated by a coherent light source and propagating parallel to the optical axis of the diffractive layers 16. According to the forward model, this incoming wave is modulated by an object at the input plane creating the complex wave field impinging on the $1^{st}$ layer of a diffractive optical neural network after free-space propagation. The object functions of handwritten digits (MNIST dataset) were modeled as amplitude-only transmissive objects taking values between 0 (no transmission) and 1 (full transmission). The samples of Fashion-MNIST and CIFAR-10 datasets, on the other hand, were assumed to represent the phase channels of the transparent objects (unit amplitude transmission at every point), modulating only the phase of the input beam while preserving the amplitude distribution.

In the diffractive neural system and classifier designs, five (5) fully-connected diffractive layers 16 (phase-only modulation with each layer having 40 k (200×200) neurons) were taken as building blocks. Although, the framework can be applied for the design of diffractive layers 16 capable of modulating both the amplitude and phase of an incoming wave, fabrication of phase-only layers, in general, is preferable in terms of fabrication complexity and yield. Hence, the trainable parameter space for the diffractive optical classifiers investigated herein contains only a phase modulation variable per neuron, resulting in a total of 0.2 million trainable variables for a 5-layer diffractive optical network, which constitutes the building block of the presented diffractive neural systems, D. For training of the diffractive optical neural networks 10 discussed herein, the phase modulation parameter of each neuron was initialized as a Gaussian random variable with zero mean and 0.2π standard deviation.

Implementation of differential diffractive optical neural networks. The differential detection model, in the context of diffractive optical classification systems, defines the class scores based on normalized differences between the positive and the negative optical sensor/detector 32p, 32n signals at the output plane(s). With a pair of sensors/detectors 32p, 32n assigned per class (a positive and a negative optical sensor/detector), the normalized difference for class m, is computed by:

$$I_{m,out} = \frac{I_{m,+} - I_{m,-}}{I_{m,+} + I_{m,-}}, \quad (1)$$

where, $I_{m,+}$ and $I_{m,-}$ stand for the optical signal of the positive and the negative sensors/detectors 32p, 32n of class m, respectively. Due to scale-variant operation of the softmax function, the class scores ($I'_{m,out}$) were defined as the scaled versions of normalized differences in Eq. (1) according to;

$$I'_{m,out} = I_{m,out}/T, \quad (2)$$

Where, T denotes a multiplicative scaling factor (also referred to as the 'temperature' hyperparameter in machine learning literature) and $I'_{m,out}$ is the class score of class m. For the results presented herein, T was set as 0.1, determined based on empirical observations. It is important to note that the sole purpose of Eq. 2 is to improve the speed of convergence of diffractive neural network optimization during the training phase and the blind testing classification performance of the final model. Therefore, when the softmax function is replaced with a max operation in the validation and testing processes, Eq. 2 is no longer used as part of the forward model and the blind prediction is solely made based on the output of Eq. (1).

The differential measurement technique is implemented using two different design approaches. In the first model, the positive and negative sensors/detectors 32p, 32n representing a class are placed on the same output plane after a diffractive neural network 14, i.e., D([M/N,M/N],[N,L,P]). The second architecture, D([M/N][M/N],[2N,L,P]), is composed of 2N diffractive optical neural networks that independently control the light intensity detected by the positive and negative sensors/detectors 32p, 32n assigned for different classes. Despite joint-optimization of the diffractive neural networks in these models, it was assumed that the diffractive networks are optically isolated from each other, meaning that the optical waves propagating through different diffractive neural networks do not interfere with each other.

Note that when T is set to be exponentially growing as a function of the number of epochs during the training phase, a slightly better inference performance was observed for D([M/N,M/N],[N,L,P]) architecture. For example, in the case of D([10,10],[1,5,40 k]) when T was initialized as 0.1 and increased every 25 epochs by a multiplicative factor of e (e.g., at 50th epoch, T=0.1×$e^2$), the blind testing accuracy achieved for CIFAR-10 dataset improved from 48.51% to 49.36%.

Class-specific diffractive neural networks. Division of elements of a target dataset into smaller sets based on their class labels was used to improve the inference performance of diffractive neural networks. In the training of class-specific diffractive neural networks, the target dataset was divided into sub-groups of classes and these sub-groups were split among parallel, simultaneously optimized diffractive neural networks. Although, these diffractive networks were trained simultaneously, the optical waves modulated by each network were assumed to be isolated from other diffractive networks of the same neural system, D. If used without the differential measurement scheme described earlier, the class-scores were directly calculated by the normalized signals of individual sensors/detectors placed at the output planes of the corresponding diffractive networks using:

$$I'_{m,out} = \frac{I_m}{\max(I_m) \times T} \quad (3)$$

where, $I_m$ denotes the optical signal of the detector assigned to class m, max($I_m$) refers to the maximum optical signal among all the sensors/detectors, and T is a non-learnable, hyper parameter used only during the training phase. For the designs presented herein, T=0.1 was selected empirically to improve the convergence speed and accuracy of the final model. As in the case of Eq. (2), once the joint-training of class-specific diffractive networks was completed, Eq. (3) was no longer used and the class predictions during the validation as well as blind testing stages were determined by selecting the maximum of the detected optical signals. When the class-specific diffractive neural networks were combined with the differential measurement method, Eq. (3) was accordingly replaced with the normalized signal difference calculation shown in Eq. (1) and the subsequent class score definition given in Eq. (2).

Ensemble of diffractive optical neural networks. Bagging and ensemble methods are commonly used in machine learning literature to create multi-classifier systems that have superior performance compared to each individual unit constituting them. In these systems, the class scores coming from individual classifier units are merged into a single vector by means of arithmetic or geometric averaging, or by using majority voting schemes. Similarly, independently-optimized diffractive neural networks were used forming an ensemble and assumed that the diffracted optical signal from each optical network is super-imposed with the diffracted light of the other networks on the same (i.e., common) output plane, containing the photo-detectors. Assuming that the relative optical path length difference between any two diffractive networks of the ensemble is longer than the temporal coherence length of the illumination beam, the sensors/detectors 32 at the output plane incoherently add up the light intensities generated by the independent diffractive networks. Apart from coherence engineering, an alternative option could be to sequentially measure the detector signals at the common output plane, one diffractive network at a given time, and digitally combine the class scores after the measurements. Both of these approaches (simultaneous incoherent summation of the projected light intensities at the common output plane vs. sequential capture of each diffractive network's output at the common detector plane and averaging of the class scores) achieved the same inference performance. To evaluate the performance of an ensemble of diffractive optical neural networks, multiple replicas of a diffractive classifier design, D, were trained by randomly changing the batch sequences and the initial phase modulation parameters of the diffractive layers for each replica. After every epoch, the corresponding model of each diffractive classifier unit was saved. When the training of all the individual units was finished, the best ensemble combination was selected based on their collaborative classification accuracy calculated using the validation dataset.

The training strategy of setting Tin Eq. (2) to be an exponentially growing parameter as a function of the number of epochs was also tested in the context of ensemble models. For example, a 3-unit ensemble model, where each individual differential diffractive network was trained using an exponentially growing T, achieved 50.86% blind testing accuracy, which is lower compared to 51.44% testing accuracy provided by the ensemble of 3 independently-optimized networks trained with a constant T=0.1. A similar behavior was also observed for 2-unit ensemble models.

Details of model training. Object classification performances of all the models presented herein were trained and tested on three widely used datasets: MNIST, Fashion-MNIST and CIFAR-10. For MNIST and Fashion-MNIST datasets, 55000 samples were used as training data while the remaining 15000 objects were divided into two sets of 5000 and 10000 for validation and testing, respectively. The CIFAR-10 dataset was partitioned into three sets of 45000, 5000 and 10000 samples, used for training, validation and testing of the diffractive neural networks, respectively. Since the samples of CIFAR-10 dataset contain three color channels (red, green and blue), they were converted to grayscale using built-in rgb_to_grayscale function in TensorFlow to comply with the monochromatic (or quasi-monochromatic) illumination used in the diffractive network models.

Softmax cross-entropy was used as the loss function for all the neural network models (optical or electronic) presented in this work. With $I'_{m,out}$ denoting the class score of $m^{th}$ class, the classification loss can be computed by:

$$\text{Loss} = -\Sigma_{m=1}^{M} g_m \log(c_m) \quad (4)$$

where M, $c_m$ and $g_m$ denote (1) the total number classes in a given dataset, (2) the probability of an input being a member of class m according to softmax function, $$\frac{\exp(I'_{m,out})}{\Sigma_{m=1}^{M} \exp(I'_{m,out})},$$

and (3) the $m^{th}$ entry of the one-hot ground truth label vector, respectively.

Figure 3A:
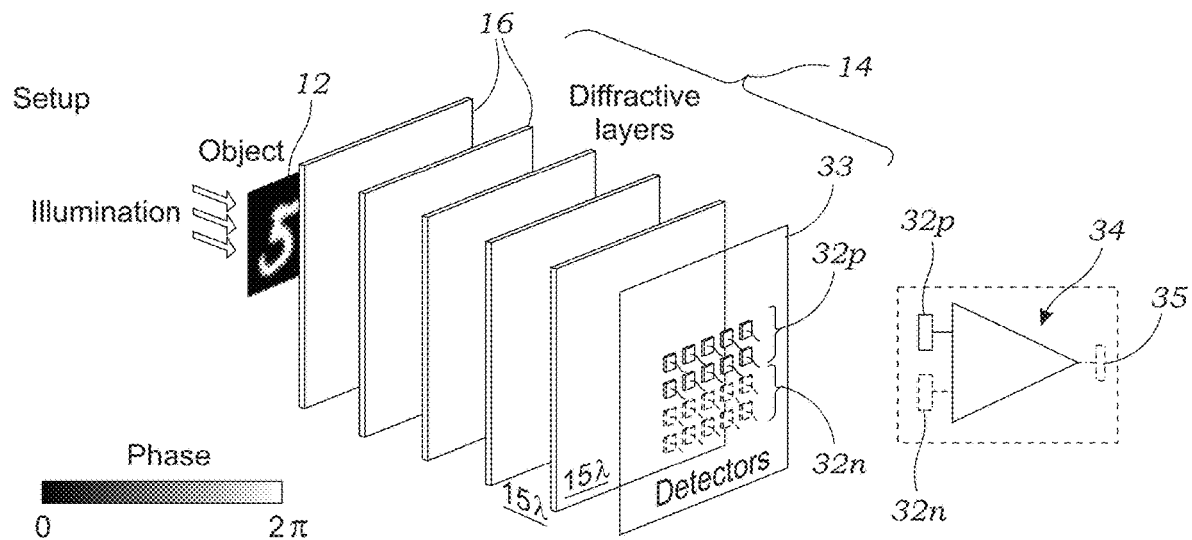
FIG. 3A illustrates the setup of the differential diffractive network design, D([M,M],[1,L,P]) according to one embodiment. In the example shown in FIG. 3A, M=10, L=5, P=40 k.
Figure 3B:
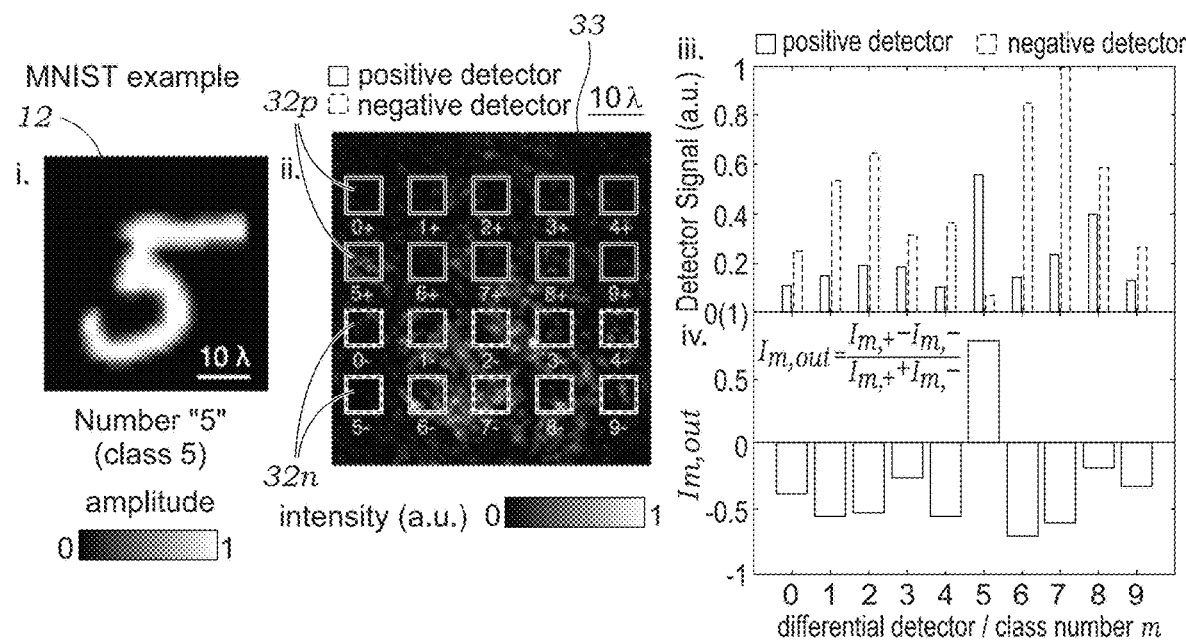
FIG. 3B illustrates how the differential diffractive network of FIG. 3A correctly classified test object from the MNIST dataset is shown. Subparts of FIG. 3B illustrate the following: i. Target object placed at the input plane and illuminated by a uniform plane wave, ii. Normalized intensity distribution observed at the output plane of the diffractive optical neural network, iii. Normalized optical signal detected by the positive (upper two rows) sensors/detectors and the negative (lower two rows) sensors/detectors, iv. Differential class scores computed according Eq. (1) using the values in (iii).
Figure 3C:
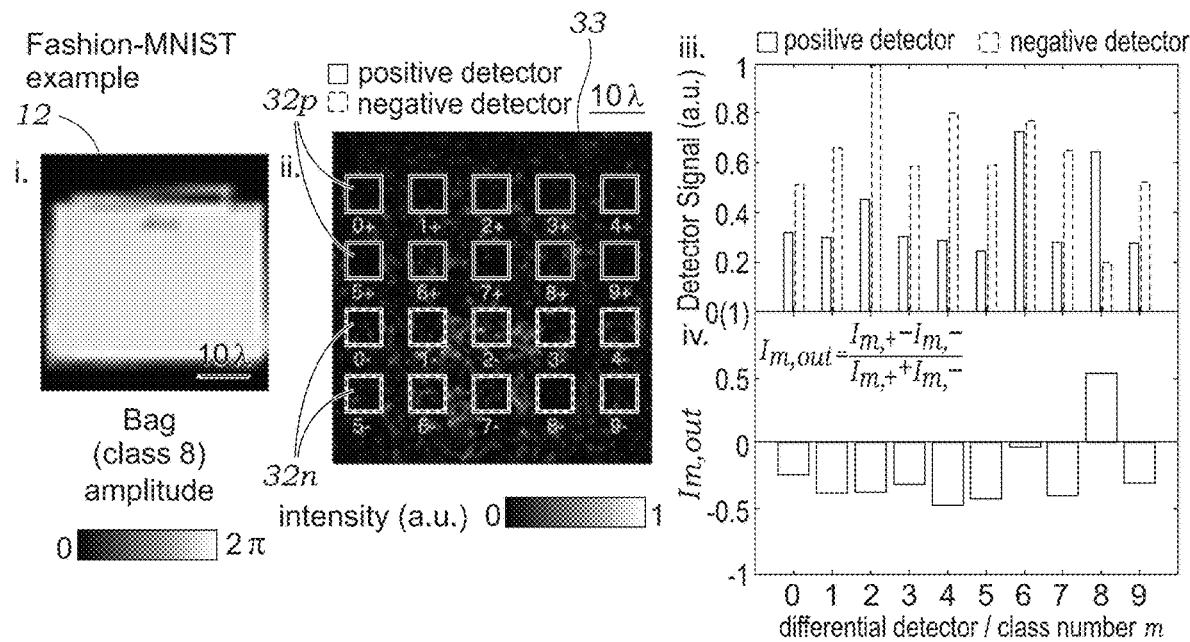
FIGS. 3C and 3D are same as in FIG. 3B, except for Fashion-MNIST and CIFAR-10 datasets, respectively. Note that while the input object in FIG. 3B is modeled as an amplitude-encoded object, the gray levels shown in FIGS. 3C and 3D represent phase-encoded perfectly transparent input objects. Since diffractive optical neural networks operate using coherent illumination, phase and/or amplitude channels of the input plane can be used to represent information.
Figure 3D:
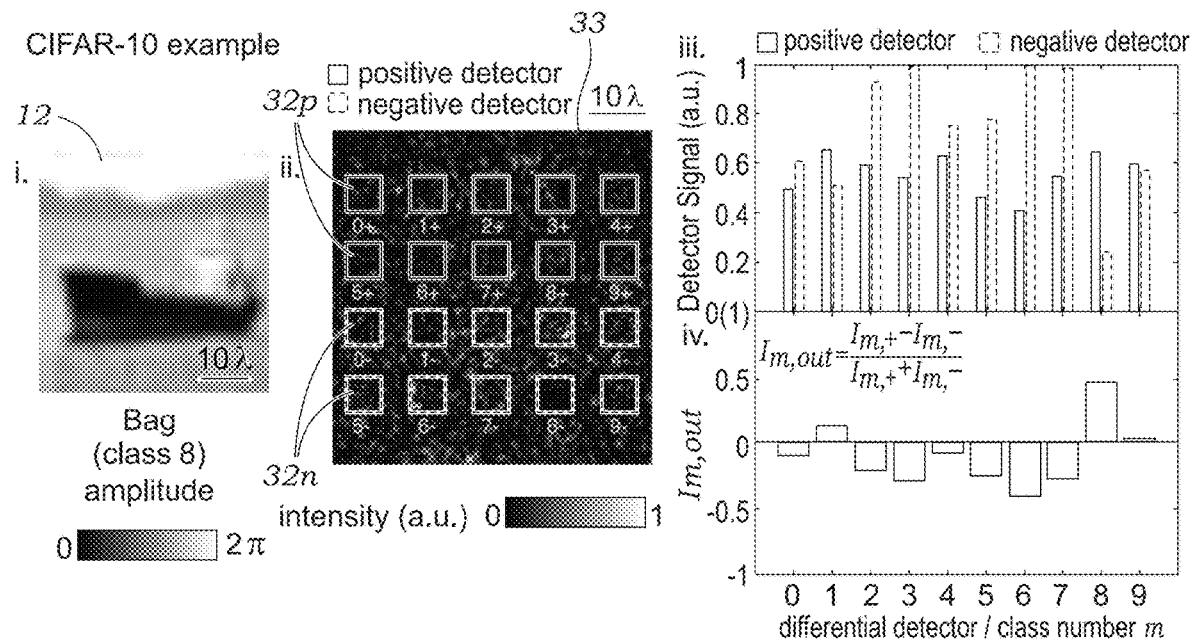

All the diffractive optical neural networks 10 described herein (optical or electronic) were simulated using Python (v3.6.5) and Google TensorFlow (v1.10.0) framework. Adam optimizer was used during the training of all models. The parameters of Adam optimizer were kept identical between each model, and taken as the default values in the TensorFlow implementation. The learning rate was initially set as 0.001, but an exponential decay was applied in every eight (8) epochs such that the new learning rate equals to 0.7 times the previous one. All the models were trained for 50 epochs and the best model was selected based on the classification performance on the validation set. For each model, the training was independently repeated six (6) times with random batch sequences and initial phase modulation variables. The blind testing accuracy for each diffractive neural network design discussed herein reports the mean value over these six (6) repetitions, applied to testing datasets. For the training of the models, a desktop computer with a NVIDIA GeForce GTX 1080 Ti Graphical Processing Unit (GPU) and Intel Core™ i7-7700 CPU @3.60 GHz and 16 GB of RAM, running Microsoft Windows 10 operating system was used. The typical training time of the diffractive neural network shown in FIG. 3A is ~6 hours. For computationally more demanding architectures such as D([1,1], [10,5,40 k]) and D([1][1],[20,5,40 k]) the training time increased to ~26 hours and ~46 hours, respectively.

While embodiments of the present invention have been shown and described, various modifications may be made without departing from the scope of the present invention. The invention, therefore, should not be limited except to the following claims and their equivalents.

What is claimed is:

1. A diffractive optical neural network device for machine learning, classification, and/or processing of at least one optical image, signal, or data comprising:

a plurality of optically transmissive and/or reflective substrate layers arranged in one or more optical paths, each of the plurality of optically transmissive and/or reflective substrate layers comprising a plurality of physical features formed on or within the optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between an input optical image, input optical signal, or input data to the plurality of optically transmissive and/or reflective substrate layers and one or more output optical images, output optical signals, or data created by optical diffraction/reflection through/off the plurality of optically transmissive and/or reflective substrate layers;

a plurality of groups of optical sensors configured to sense and detect the output optical images, output optical signals, or data resulting from the plurality of optically transmissive and/or reflective substrate layers, wherein each group of optical sensors comprises at least one optical sensor configured to capture a positive signal from the output optical images, output optical signals, or data and at least one optical sensor configured to capture a negative signal from the output optical images, output optical signals, or data; and circuitry and/or computer software configured to identify a group of optical sensors within the plurality of groups of optical sensors in which a normalized signal difference calculated from the positive and negative optical sensors within each group that has a largest or a smallest normalized signal difference of among all the groups.

2. The diffractive optical neural network device of claim 1, wherein the plurality of groups of optical sensors are assigned to represent different classes of the input optical image, input optical signal, or input data, and the group with the largest or the smallest normalized signal difference calculated from the positive and negative optical sensors determine an inference for the class of input optical image, input optical signal, or input data.

3. The diffractive optical neural network device of claim 1, wherein the signals from the respective optical sensors are multiplied by trainable coefficients or scaling factors.

4. The diffractive optical neural network device of claim 1, wherein the plurality of groups of optical sensors are located on a common plane or surface.

5. The diffractive optical neural network device of claim 1, wherein at least some of the groups of optical sensors are located on different planes or surfaces.

6. The diffractive optical neural network device of claim 1, wherein one or more of the optically transmissive and/or reflective substrate layers comprise reconfigurable spatial light modulators.

7. A diffractive optical neural network device for machine learning, classification, and/or processing of at least one optical image, signal, or data comprising:

a plurality of diffractive optical neural network devices configured to receive an input optical image, input optical signal, or data, each of the plurality of diffractive optical neural network devices comprising:

a plurality of optically transmissive and/or reflective substrate layers arranged in one or more optical paths, each of the optically transmissive and/or reflective substrate layers comprising a plurality of physical features formed on or within the plurality of optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between the input optical image, input optical signal, or data to the plurality of optically transmissive and/or reflective substrate layers and one or more output optical images, output optical signals, or data created by optical diffraction/reflection through/off the plurality of optically transmissive and/or reflective substrate layers;

one or more optical sensors configured to sense and detect the output optical images, output optical signals, or data resulting from the plurality of optically transmissive and/or reflective substrate layers for each of the plurality of diffractive optical neural network devices.

8. The diffractive optical neural network device of claim 7, wherein the one or more optical sensors are located on a common plane or surface.

9. The diffractive optical neural network device of claim 7, wherein the one or more optical sensors are located on different planes or surfaces.

10. The diffractive optical neural network device of claim 7, wherein the one or more optical sensors comprise a plurality of groups of optical sensors configured to sense the output optical images, output optical signals, or data resulting from each of the diffractive optical neural network devices, wherein each group of optical sensors comprises at least one optical sensor configured to capture a positive signal from the output optical images, output optical signals, or data and at least one optical sensor configured to capture a negative signal from the output optical images, output optical signals, or data.

11. The diffractive optical neural network device of claim 10, further comprising circuitry and/or computer software configured to identify a group of optical sensors within the plurality of groups of optical sensors in which a normalized signal difference between the optical sensor groups that has a largest or a smallest normalized signal difference of the plurality of groups of optical sensors, and determining a class of the input optical image, input optical signal, or data.

12. The diffractive optical neural network device of claim 10, wherein the signals from the respective optical sensors are multiplied by trainable coefficients or scaling factors.

13. The diffractive optical neural network device of claim 7, wherein one or more of the optically transmissive and/or reflective substrate layers comprise reconfigurable spatial light modulators.

14. A diffractive optical neural network device for machine learning, classifying, and/or processing at least one optical image, signal, or data comprising:

a plurality of optically transmissive and/or reflective substrate layers arranged in one or more optical paths, each of plurality of optically transmissive and/or reflective substrate layers comprising a plurality of physical features formed on or within plurality of optically transmissive and/or reflective substrate layers and having different complex-valued transmission and/or reflection coefficients as a function of lateral coordinates across each substrate layer, wherein the plurality of optically transmissive and/or reflective substrate layers and the plurality of physical features thereon collectively define a trained mapping function between an input optical image, optical signal, or data to plurality of optically transmissive and/or reflective substrate layers and one or more output optical images, optical signals, or data created by optical diffraction/reflection through/off the plurality of optically transmissive and/or reflective substrate layers;

a plurality of groups of optical sensors configured to sense and detect the output optical images, optical signals, or data resulting from plurality of optically transmissive and/or reflective substrate layers, wherein each group of optical sensors comprises at least one optical sensor configured to capture a positive signal from the one or more output optical images, optical signals, or data and at least one optical sensor configured to capture a negative signal from the one or more output optical images, optical signals, or data, wherein the optical sensors of each group are each associated with individual scaling factors; and circuitry and/or computer software configured to identify a group of optical sensors within the plurality of groups of optical sensors in which a signal difference between the optical sensor groups calculated using the corresponding scaling factors that has a largest or a smallest normalized signal difference of the plurality of groups of optical sensors.

15. The device of claim 14, wherein the scaling factors are pre-determined.

16. The device of claim 14, wherein the scaling factors are learned using machine learning and training.

17. The device of claim 14, wherein the scaling factors are all equal to 1 or another constant for each class of image, signal, or data.

18. The device of claim 14, wherein one or more of the optically transmissive and/or reflective substrate layers comprise reconfigurable spatial light modulators.

19. A diffractive optical neural network device for machine learning, classifying, and/or processing at least one optical image, signal, or data comprising:
- a plurality of diffractive optical neural network devices configured to receive light from an input optical image, signal, or data, each of the plurality of diffractive optical neural network devices comprising:
  - a plurality of optically transmissive and/or reflective substrate layers arranged in one or more optical paths, each of the plurality of optically transmissive and/or reflective substrate layers comprising a plurality of physical features formed on or within the plurality of optically transmissive and/or reflective substrate layers and having different complex-valued transmission/reflection coefficients as a function of lateral coordinates across each substrate layer, wherein the plurality of optically transmissive and/or reflective substrate layers and the plurality of physical features thereon collectively define a trained mapping function between an input optical image, optical signal, or data to the plurality of optically transmissive and/or reflective substrate layers and one or more output optical images, optical signals, or data created by optical diffraction/reflection through/off the plurality of optically transmissive and/or reflective substrate layers;
- a plurality of groups of optical sensors configured to sense and detect the output optical images, optical signals, or data resulting from the plurality of optically transmissive and/or reflective substrate layers, wherein each group of optical sensors comprises at least one optical sensor configured to capture a positive signal from the one or more output optical images, optical signals, or data and at least one optical sensor configured to capture a negative signal from the one or more output optical images, optical signals, or data, wherein the optical sensors of each group are each associated with individual scaling factors; and
- circuitry and/or computer software configured to identify a group of optical sensors within the plurality of groups of optical sensors in which a signal difference between the optical sensor groups calculated using the corresponding scaling factors that has a largest or a smallest normalized signal difference of the plurality of groups of optical sensors, wherein the identified group corresponds to a particular class of the input optical image, signal, or data.

20. The device of claim 19, wherein the scaling factors are pre-determined.

21. The device of claim 19, wherein the scaling factors are learned using machine learning and training.

22. The device of claim 19, wherein the scaling factors are all equal to 1 or another constant for each class of image, signal, or data.

23. The device of claim 19, wherein one or more of the optically transmissive and/or reflective substrate layers comprise reconfigurable spatial light modulators.

* * * * *